United States Patent
Zhang et al.

(10) Patent No.: US 11,963,221 B2
(45) Date of Patent: Apr. 16, 2024

(54) COMMUNICATION METHOD AND COMMUNICATIONS APPARATUS FOR USING UNLICENSED FREQUENCY BAND

(71) Applicant: HUAWEI TECHNOLOGIES CO., LTD., Guangdong (CN)

(72) Inventors: Xu Zhang, Beijing (CN); Lixia Xue, Beijing (CN); Yongxing Zhou, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 493 days.

(21) Appl. No.: 17/197,191

(22) Filed: Mar. 10, 2021

(65) Prior Publication Data

US 2021/0195645 A1    Jun. 24, 2021

Related U.S. Application Data

(63) Continuation of application No. PCT/CN2019/105022, filed on Sep. 10, 2019.

(30) Foreign Application Priority Data

Sep. 11, 2018   (CN) .................. 201811057717.4

(51) Int. Cl.
*H04W 72/04*       (2023.01)
*H04W 72/0446*   (2023.01)
(Continued)

(52) U.S. Cl.
CPC ... *H04W 74/0816* (2013.01); *H04W 72/0446* (2013.01); *H04W 72/23* (2023.01); *H04W 74/008* (2013.01); *H04W 76/11* (2018.02)

(58) Field of Classification Search
CPC ....................... H04W 72/0446; H04W 74/008; H04W 76/11
See application file for complete search history.

(56) References Cited

U.S. PATENT DOCUMENTS 11,096,106 B2 *  8/2021  Salkintzis ........... H04L 12/5692
2015/0038143 A1   2/2015  Kilpatrick, II et al.
(Continued)

FOREIGN PATENT DOCUMENTS

CN    104185217 A    12/2014
CN    105228199 A    1/2016
(Continued)

OTHER PUBLICATIONS

Action issued in CN 201811057717.4, dated Jul. 5, 2021, total 5 pages.
(Continued)

*Primary Examiner* — Fahmida S Chowdhury

(57) ABSTRACT

A communication method for using an unlicensed frequency band is provided. The method includes: A first wireless device receives first indication information in a first time unit, where the first indication information is used to indicate a second wireless device to transmit data in a second time unit, or the first indication information is used to indicate a second wireless device not to transmit data in a second time unit, where the second time unit is a preset time unit used by the second wireless device to transmit data.

16 Claims, 12 Drawing Sheets

800

| S810: A second wireless device obtains first indication information, where the first indication information is used to indicate the second wireless device to transmit data in a second time unit, or the first indication information is used to indicate the second wireless device not to transmit data in the second time unit, or the first indication information is used to indicate whether the second wireless device transmits data in a second time unit, where the second time unit is a preset dedicated time unit of the second wireless device |

| S820: The second wireless device sends the first indication information in a first time unit, where a time domain position of the first time unit is before a time domain position of the second time unit |

(51) Int. Cl.
*H04W 72/23* (2023.01)
*H04W 74/00* (2009.01)
*H04W 74/0816* (2024.01)
*H04W 76/11* (2018.01)

(56) References Cited

U.S. PATENT DOCUMENTS

| | | | |
|---|---|---|---|
| 2016/0135171 A1 | 5/2016 | Korhonen et al. | |
| 2016/0345360 A1* | 11/2016 | Papaleo | H04W 74/08 |
| 2016/0353437 A1 | 12/2016 | Sun et al. | |
| 2017/0332358 A1* | 11/2017 | Park | H04L 1/1671 |
| 2018/0091242 A1* | 3/2018 | Li | H04B 17/318 |
| 2018/0124749 A1* | 5/2018 | Park | H04W 72/23 |
| 2018/0124781 A1* | 5/2018 | Jiang | H04L 27/2656 |
| 2018/0220459 A1* | 8/2018 | Park | H04W 74/08 |
| 2019/0289614 A1* | 9/2019 | Li | H04W 72/0446 |
| 2019/0373509 A1* | 12/2019 | Yang | H04L 27/0006 |
| 2021/0144757 A1* | 5/2021 | Fazili | H04W 16/14 |

FOREIGN PATENT DOCUMENTS

| | | | |
|---|---|---|---|
| CN | 105337715 A | 2/2016 | |
| CN | 105657847 A | 6/2016 | |
| CN | 106412931 A | 2/2017 | |
| EP | 3285535 A1 | 2/2018 | |
| WO | 2009158050 A2 | 12/2009 | |
| WO | 2018089354 A1 | 5/2018 | |

OTHER PUBLICATIONS

3GPP TSG RAN WG1 Meeting #93, R1-1806797: "Channel access to NR-based unlicensed spectrum", MediaTek Inc, Busan, Korea, May 21-25, 2018, total 5 pages.
Office Action issues in CN 201811057717.4, dated Sep. 30, 2020, total 3 pages.
Search Report issued in CN 2018110577174, dated Sep. 23, 2020, total 2 pages.
International Search Report and Written Opinion issued in PCT/CN2019/105022, dated Nov. 27, 2019, total 8 pages.
ERICSSON: "Mode-1 SPS for V2V over PC5", 3GPP Draft; R1-165272, May 14, 2016, XP051089792, total 5 pages.
Extended European Search Report issued in EP19860516.4, dated Oct. 19, 2021, 12 pages.
Office Action issued in EP19860516.4, dated Dec. 21, 2023, 5 pages.

\* cited by examiner

400

A first wireless device receives first indication information in a first time unit, where the first indication information is used to indicate a second wireless device to transmit data in a second time unit, or the first indication information is used to indicate a second wireless device not to transmit data in a second time unit, or the first indication information is used to indicate whether a second wireless device transmits data in a second time unit, where the second time unit is a preset dedicated time unit of the second wireless device, and a time domain position of the first time unit is before a time domain position of the second time unit ⸻ Step 410

The first wireless device performs channel detection and/or CCA in a third time unit, where the first indication information indicates that the second time unit is not used by the second wireless device to transmit data, or the second time unit can be used by the first wireless device to transmit data, or the second time unit is a time unit that can be shared.

Step 420

The first wireless device does not perform the channel detection and/or the CCA before the second time unit, where the first indication information is used to indicate that the second time unit is used by the second wireless device to transmit data, or the second time unit cannot be used by the first wireless device to transmit data, or the second time unit is a time unit that cannot be shared.

Step 430

FIG. 4

COMMUNICATION METHOD AND
COMMUNICATIONS APPARATUS FOR
USING UNLICENSED FREQUENCY BAND

CROSS-REFERENCE TO RELATED
APPLICATIONS

This application is a continuation of International Application No. PCT/CN2019/105022, filed on Sep. 10, 2019, which claims priority to Chinese Patent Application No. 201811057717.4, filed on Sep. 11, 2018. The disclosures of the aforementioned applications are hereby incorporated by reference in their entireties.

TECHNICAL FIELD

This application relates to the communications field, and in particular, to a communication method and a communications apparatus for using an unlicensed frequency band.

BACKGROUND

In a 5th generation (5G) mobile communications system, a wireless device is supported in performing communication in an unlicensed band. In this manner, a same frequency domain resource needs to be shared by a plurality of different wireless devices.

In this system, different wireless devices need to occupy a shared frequency domain resource according to a rule. For example, 10 milliseconds (ms) is used as an access period, and a wireless device A needs to detect a channel occupation status before the access period, that is, perform clear channel assessment (CCA). If the wireless device A detects a wireless signal or detects relatively strong wireless signal energy on a channel when performing the CCA, the wireless device A determines that the channel detected in the current access period cannot be used, or the detected channel is occupied by another wireless device, and the wireless device A no longer sends information in the access period, or does not serve as an initiating device to send information in the access period, to avoid interfering information sent by another wireless device in the access period. If the wireless device A detects no wireless signal or detects no relatively strong wireless signal energy on a channel when performing the CCA, the wireless device A may send a signal to prevent another wireless device from using the access period as an access period of the initiating device of the wireless device, and send information at a time domain start position of the access period.

However, time domain positions at which different wireless devices perform CCA are independently determined by the wireless devices. Therefore, different wireless devices may simultaneously perform CCA in a same time unit. For example, if the wireless device A and a wireless device B detect no radio signal or strong radio signal energy on a channel when performing the CCA in a same time domain symbol, the two wireless devices both consider themselves as initiating devices in a next access period, and simultaneously send data information at a same time domain start position in the next access period. Consequently, information sent by the wireless device A and the wireless device B interferes with each other, and overall transmission performance of a network is reduced.

SUMMARY

Example embodiments of this application provide a communication method and a communications apparatus for using an unlicensed frequency band, to improve reliability of performing communication by a wireless device by using an unlicensed frequency band.

According to a first aspect, an example communication method for using an unlicensed frequency band is provided, including: receiving, by a first wireless device, first indication information in a first time unit, where the first indication information is used to indicate a second wireless device to transmit data in a second time unit, or the first indication information is used to indicate a second wireless device not to transmit data in a second time unit, where the second time unit is a preset time unit used by the second wireless device to transmit data.

In the foregoing solution, dedicated time units are allocated to some wireless devices (for example, a second wireless device), to ensure transmission reliability of the wireless devices and avoid the problem described in the background. Dedicated time units of different wireless devices do not overlap, or partially overlap, or completely overlap in time domain. Relationships among the dedicated time units of different wireless devices in time domain resources are related to interference among different wireless devices. If there is weak channel interference or signal interference among different wireless devices, the dedicated time units of the different wireless devices may partially or completely overlap in time domain. If there is strong channel interference or signal interference among different wireless devices, the dedicated time units of the different wireless devices do not overlap in time domain.

Optionally, the method further includes: performing, by the first wireless device, channel detection and/or CCA in a third time unit, where the first indication information indicates the second wireless device not to transmit data in the second time unit, where a time domain position of the third time unit is after a time domain position of the first time unit, and the time domain position of the third time unit is before a time domain position of the second time unit.

When the second wireless device does not transmit data in the second time unit, the first wireless device may choose to perform the channel detection and/or the CCA before the second time unit, to contend for a right of use of the second time unit, so that resource utilization of the unlicensed frequency band can be improved.

Optionally, the first indication information indicates the second wireless device not to transmit data in the second time unit, and the method further includes: receiving or detecting, by the first wireless device, second indication information in a fourth time unit, where the second indication information is used to indicate whether the first wireless device is capable of transmitting data in the second time unit, where a time domain position of the fourth time unit is before the time domain position of the second time unit, and the time domain position of the fourth time unit is after the time domain position of the first time unit.

The first wireless device may alternatively detect the second indication information after determining that the second wireless device does not use the second time unit, to determine whether the first wireless device can use the second time unit.

Optionally, the method further includes: performing, by the first wireless device, the channel detection and/or the CCA in a fifth time unit, where a time domain position of the fifth time unit is before the time domain position of the second time unit, and the time domain position of the fifth time unit is after the time domain position of the fourth time unit.

After determining that the first wireless device can use the second time unit, the first wireless device may perform the channel detection and/or the CCA in the fifth time unit, to determine a channel usage status in the second time unit.

Optionally, the second indication information includes an identifier of the first wireless device, and/or the second indication information includes a group identifier of a wireless device group to which the first wireless device belongs; or the second indication information does not include an identifier of the first wireless device, and/or the second indication information does not include a group identifier of a wireless device group to which the first wireless device belongs.

The first wireless device may determine, depending on whether the second indication information carries the identifier of the first wireless device, whether the first wireless device can use the second time unit, and/or the first wireless device may determine, depending on whether the second indication information carries the group identifier of the wireless device group to which the first wireless device belongs, whether the first wireless device can use the second time unit. In this way, a plurality of wireless devices that interfere with each other can be prevented from contending for the second time unit at the same time.

According to a second aspect, an embodiment of this application provides a communication method for using an unlicensed frequency band, including: obtaining, by a second wireless device, first indication information, where the first indication information is used to indicate the second wireless device to transmit data in a second time unit, or the first indication information is used to indicate the second wireless device not to transmit data in a second time unit, where the second time unit is a preset time unit used by the second wireless device to transmit data, and sending, by the second wireless device, the first indication information in a first time unit.

In the foregoing embodiment, dedicated time units are allocated to some wireless devices (for example, a second wireless device), to ensure transmission reliability of the wireless devices and avoid the problem described in the background. Dedicated time units of different wireless devices do not overlap, or partially overlap, or completely overlap in time domain. Relationships among the dedicated time units of different wireless devices in time domain resources are related to interference among different wireless devices. If there is weak channel interference or signal interference among different wireless devices, the dedicated time units of the different wireless devices may partially or completely overlap in time domain. If there is strong channel interference or signal interference among different wireless devices, the dedicated time units of the different wireless devices do not overlap in time domain.

Optionally, the first indication information indicates the second wireless device not to transmit data in the second time unit, and the method further includes: sending, by the second wireless device, second indication information in a fourth time unit, where the second indication information is used to indicate a wireless device that transmits data in the second time unit, where a time domain position of the fourth time unit is before a time domain position of the second time unit, and the time domain position of the fourth time unit is after a time domain position of the first time unit.

When the second wireless device does not transmit data in the second time unit, the second wireless device may send the second indication information, to indicate a wireless device that can use the second time unit, to avoid that a plurality of wireless devices that interfere with each other succeed in contending for the second time unit at the same time, so that resource utilization of the unlicensed frequency band can be improved. Alternatively, the wireless device indicated by the second indication information may be a wireless device having to-be-transmitted emergency data.

Optionally, the second indication information includes an identifier of the wireless device, and/or the second indication information includes a group identifier of a wireless device group to which the wireless device belongs.

Optionally, the first indication information indicates the second wireless device to transmit data in the second time unit, and the method further includes: performing, by the second wireless device, channel detection and/or CCA in a sixth time unit, where a time domain position of the sixth time unit is before a time domain position of the second time unit, and the time domain position of the sixth time unit is after a time domain position of a fourth time unit.

After determining to transmit data in the second time unit, the second wireless device may perform the channel detection and/or the CCA before the second time unit, to determine a channel usage status in the second time unit.

Optionally, the method further includes: determining, by the second wireless device, the second time unit.

Optionally, the determining, by the second wireless device, the second time unit includes: determining, by the second wireless device, the second time unit according to a preset rule; or obtaining, by the second wireless device, higher layer signaling, where the higher layer signaling is used to indicate the second time unit; and determining, by the second wireless device, the second time unit based on the higher layer signaling.

According to a third aspect, an embodiment of this application further provides a communication method for using an unlicensed band, including: detecting, by a first wireless device, first indication information in a first time unit, where the first indication information is used to indicate a second wireless device to transmit data in a second time unit, or the first indication information is used to indicate a second wireless device not to transmit data in a second time unit, where the second time unit is a preset time unit used by the second wireless device to transmit data, and a time domain position of the first time unit is before a time domain position of the second time unit.

In the foregoing solution, dedicated time units are allocated to some wireless devices (for example, a second wireless device), to ensure transmission reliability of the wireless devices and avoid the problem described in the background. Dedicated time units of different wireless devices do not overlap, or partially overlap, or completely overlap in time domain. Relationships among the dedicated time units of different wireless devices in time domain resources are related to interference among different wireless devices. If there is weak channel interference or signal interference among different wireless devices, the dedicated time units of the different wireless devices may partially or completely overlap in time domain. If there is strong channel interference or signal interference among different wireless devices, the dedicated time units of the different wireless devices do not overlap in time domain.

Optionally, the method further includes: performing, by the first wireless device, channel detection and/or CCA in a third time unit, where the first wireless device detects the first indication information in the first time unit; or skipping performing, by the first wireless device, channel detection and/or CCA in a third time unit, where the first wireless device detects no first indication information in the first time unit, where the first indication information is used to indicate the second wireless device not to transmit data in the second time unit, where a time domain position of the third time unit is after the time domain position of the first time unit, and the time domain position of the third time unit is before the time domain position of the second time unit.

When the second wireless device does not transmit data in the second time unit, the first wireless device may choose to perform the channel detection and/or the CCA before the second time unit, to contend for a right of use of the second time unit, so that resource utilization of the unlicensed frequency band can be improved.

Optionally, the method further includes: performing, by the first wireless device, channel detection and/or CCA in a third time unit, where the first wireless device detects no first indication information in the first time unit; or skipping performing, by the first wireless device, channel detection and/or the CCA in a third time unit, where the first wireless device detects the first indication information in the first time unit, where the first indication information is used to indicate the second wireless device to transmit data in the second time unit, a time domain position of the third time unit is after the time domain position of the first time unit, and the time domain position of the third time unit is before the time domain position of the second time unit.

When the second wireless device does not transmit data in the second time unit, the first wireless device may choose to perform the channel detection and/or the CCA before the second time unit, to contend for a right of use of the second time unit, so that resource utilization of the unlicensed frequency band can be improved.

Optionally, the first device determines that the second wireless device does not transmit data in the second time unit, the method further includes: receiving or detecting, by the first wireless device, second indication information in a fourth time unit, where the second indication information is used to indicate whether the first wireless device is capable of transmitting data in the second time unit, where a time domain position of the fourth time unit is before the time domain position of the second time unit, and the time domain position of the fourth time unit is after the time domain position of the first time unit.

The first wireless device may alternatively detect the second indication information after determining that the second wireless device does not use the second time unit, to determine whether the first wireless device can use the second time unit.

Optionally, the method further includes: performing, by the first wireless device, the channel detection and/or the CCA in a fifth time unit, where a time domain position of the fifth time unit is before the time domain position of the second time unit, and the time domain position of the fifth time unit is after the time domain position of the fourth time unit.

After determining that the first wireless device can use the second time unit, the first wireless device may perform the channel detection and/or the CCA in the fifth time unit, to determine a channel usage status in the second time unit.

Optionally, the second indication information includes an identifier of the first wireless device, and/or the second indication information includes a group identifier of a wireless device group to which the first wireless device belongs; or the second indication information does not include an identifier of the first wireless device, and/or the second indication information does not include a group identifier of a wireless device group to which the first wireless device belongs.

The first wireless device may determine, depending on whether the second indication information carries the identifier of the first wireless device, whether the first wireless device can use the second time unit, and/or the first wireless device may determine, depending on whether the second indication information carries the group identifier of the wireless device group to which the first wireless device belongs, whether the first wireless device can use the second time unit. In this way, a plurality of wireless devices that interfere with each other can be prevented from contending for the second time unit at the same time.

According to a fourth aspect, an embodiment of this application provides an apparatus for using an unlicensed frequency band, where the apparatus may implement functions corresponding to the steps in the method in the foregoing first aspect, and the functions may be implemented by hardware, or may be implemented by hardware executing corresponding software. The hardware or the software includes one or more units or modules corresponding to the foregoing functions.

In an example embodiment, the apparatus includes a processor, where the processor is configured to support the apparatus in implementing the corresponding functions in the method in the foregoing first aspect. The apparatus may further include a memory, where the memory is configured to couple to the processor, and the memory stores a program instruction and data that are necessary to the apparatus. Optionally, the apparatus further includes a transceiver, where the transceiver is configured to support communication between the apparatus and another network element.

According to a fifth aspect, an embodiment of this application provides an apparatus for using an unlicensed frequency band, where the apparatus may implement functions corresponding to the steps in the method in the foregoing second aspect, and the functions may be implemented by hardware, or may be implemented by hardware executing corresponding software. The hardware or the software includes one or more units or modules corresponding to the foregoing functions.

In an example embodiment, the apparatus includes a processor, where the processor is configured to support the apparatus in implementing the corresponding functions in the method in the foregoing second aspect. The apparatus may further include a memory, where the memory is configured to couple to the processor, and the memory stores a program instruction and data that are necessary to the apparatus. Optionally, the apparatus further includes a transceiver, where the transceiver is configured to support communication between the apparatus and another network element.

According to a sixth aspect, an embodiment of this application provides an apparatus for using an unlicensed frequency band, where the apparatus may implement functions corresponding to the steps in the method in the foregoing third aspect, and the functions may be implemented by hardware, or may be implemented by hardware executing corresponding software. The hardware or the software includes one or more units or modules corresponding to the foregoing functions.

In an example embodiment, the apparatus includes a processor, where the processor is configured to support the apparatus in implementing the corresponding functions in the method in the foregoing third aspect. The apparatus may further include a memory, where the memory is configured to couple to the processor, and the memory stores a program instruction and data that are necessary to the apparatus. Optionally, the apparatus further includes a transceiver, where the transceiver is configured to support communication between the apparatus and another network element.

According to a seventh aspect, an embodiment of this application provides a computer program product. The computer program product includes computer program code. When the computer program code is run by a communications unit and a processing unit, or a transceiver and a processor in a wireless device, the wireless device is enabled to perform the method according to the first aspect.

According to an eighth aspect, an embodiment of this application provides a computer program product. The computer program product includes computer program code. When the computer program code is run by a communications unit and a processing unit, or a transceiver and a processor in a wireless device, the wireless device is enabled to perform the method according to the second aspect.

According to a ninth aspect, an embodiment of this application provides a computer program product. The computer program product includes computer program code. When the computer program code is run by a communications unit and a processing unit, or a transceiver and a processor in a wireless device, the wireless device is enabled to perform the method according to the third aspect.

According to a tenth aspect, an embodiment of this application provides a computer storage medium. The computer storage medium is configured to store computer software instructions used by the foregoing wireless device, and the computer software instructions include a program designed to perform the method according to the first aspect.

According to an eleventh aspect, an embodiment of this application provides a computer storage medium. The computer storage medium is configured to store computer software instructions used by the foregoing wireless device, and the computer software instructions include a program designed to perform the method according to the second aspect.

According to a twelfth aspect, an embodiment of this application provides a computer storage medium. The computer storage medium is configured to store computer software instructions used by the foregoing wireless device, and the computer software instructions include a program designed to perform the method according to the third aspect.

BRIEF DESCRIPTION OF DRAWINGS

FIG. 4 is a schematic diagram of a communication method for using an unlicensed frequency band according to an embodiment of this application;

DESCRIPTION OF EMBODIMENTS

The following describes technical solutions of this application with reference to the accompanying drawings.

Figure 1:
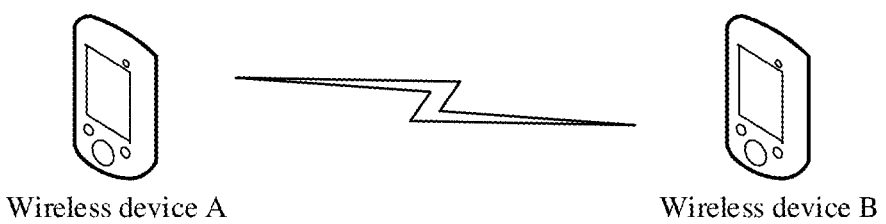
FIG. 1 shows a communications system to which one or more embodiments of this application are applicable.

FIG. 1 shows a communications system to which one or more embodiments of this application are applicable. The communications system includes a wireless device A and a wireless device B. The wireless device A communicates with the wireless device B by using a wireless network (for example, a 5G network). Using the wireless device A as an example, when the wireless device A sends information, a wireless communications module of the wireless device A may obtain information bits that need to be sent to a network device through a channel, and the information bits are, for example, information bits generated by a processing module of the wireless device A, received from another device, or stored in a storage module of a terminal device.

The wireless device A and the wireless device B may be terminal devices, or may be network devices.

In this application, the terminal device may be referred to as an access terminal, user equipment (UE), a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a handheld device having a wireless communication function, a computing device, another processing device connected to a wireless modem, a vehicle-mounted device, a wearable device, or user equipment in a 5G communications system.

The network device may be a base transceiver station (BTS) in a code division multiple access (CDMA) system, a NodeB (NB) in a wideband code division multiple access (WCDMA) system, an evolved NodeB (eNB) in a long term evolution (LTE) system, or a gNB in a 5G communications system. The foregoing base stations are only used as examples for description. Alternatively, the network device may be a relay node, an access point, a vehicle-mounted device, a wearable device, or another type of device.

The foregoing communications system to which this application is applicable is merely an example for description, and a communications system to which this application is applicable is not limited thereto. For example, the communications system may include another quantity of network devices and another quantity of terminal devices.

To facilitate understanding of the technical solutions in this application, concepts used in this application are first briefly described. A 5G system is used as an example for description in the following.

Figure 2:
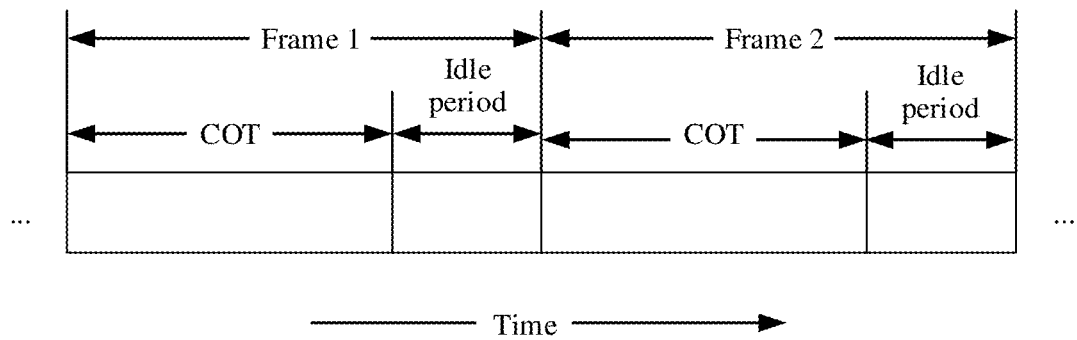
FIG. 2 is a schematic diagram of time domain resource division in a frame based equipment (FBE) access manner according to an embodiment of this application.

When using an unlicensed frequency band (which may also be referred to as a "license-free frequency band"), a wireless device needs to meet a specific condition. For example, in a frame based equipment (FBE) access manner, the wireless device starts to send data information at a time domain start position of a frame. Each frame has a fixed duration, and the fixed duration is referred to as a frame period (fixed frame period). In each frame, a part that includes no data transmission is referred to as an idle period. In each frame, a time other than the idle period is referred to as a channel occupation time (COT), and the wireless device sends and/or receives data information only in a COT part of each frame. FIG. 2 shows time domain resource division in an FBE access manner. In FIG. 2, a time domain structure of a frame is repeated consecutively in time domain. Each frame period includes a COT occupying consecutive time domain resources (or nonconsecutive time domain resources) and an idle period occupying consecutive time domain resources (or nonconsecutive time domain resources). In this application, an example in which one frame includes one COT occupying consecutive time domain resources and one or more idle periods occupying consecutive time domain resources is used for description. In one frame, a COT may be earlier than an idle period in time domain, or a COT may be later than an idle period in time domain. In this application, unless otherwise specified, a sequence of a COT and an idle period in one frame is not limited. Optionally, a frame period is variable. For example, a frame period may change semi-statically. In an example, a frame period may change from 10 ms to 20 ms, and may change once every 200 ms. Optionally, a COT and/or an idle period in the frame may also change. For example, a COT and/or an idle period in the frame are/is determined based on a value of a frame period. In an example, a frame period changes from 10 ms to 20 ms, an idle period may change from 0.5 ms to 1 ms, or a COT may change from 9.5 ms to 19 ms.

Optionally, the wireless device starts to send data information at a start time domain position (which may also be referred to as a "start position" for short) of a frame. For example, if there is to-be-transmitted data in an idle period, a time domain position at which a data can be transmitted the earliest in time domain is a start time domain position of a COT, and the start time domain position of the COT may be adjacent to the idle period in time domain. One definition of time-domain adjacency is that an end time domain position (which may also be referred to as a "time domain end position" or "end position" for short) of the idle period is the start time domain position of the COT.

Usually, before sending data information in a COT within one frame period, a wireless device detects or senses a channel occupation status before a start time domain position of the COT. In this specification, channel detection by the wireless device and channel sensing by the wireless device may be used alternatively. Optionally, an end time domain position of a time unit used for channel detection or sensing is the start time domain position of the COT. If it is not detected that the channel is occupied, the wireless device sends data information at a start time of the COT; otherwise, the wireless device does not send the data information at the start time of the COT. Because there are a plurality of wireless devices in a system, and a mechanism used in an access system is relatively independent, when the plurality of wireless devices detect a same time domain position of channels, each of the plurality of wireless devices cannot effectively detect another wireless device. Alternatively, when the plurality of wireless devices detect different time domain positions of channels, a part of the plurality of wireless devices may fail to perform wireless access.

For example, frame structures of two wireless devices are completely the same, and are completely synchronized in time domain. As shown in FIG. 2, channel detection time units of the two wireless devices are both located at an end time domain position of an idle period in a frame 1. In this case, neither of the two wireless devices can detect another wireless device, and consequently, the two wireless devices interfere with each other when sending information.

Figure 3:
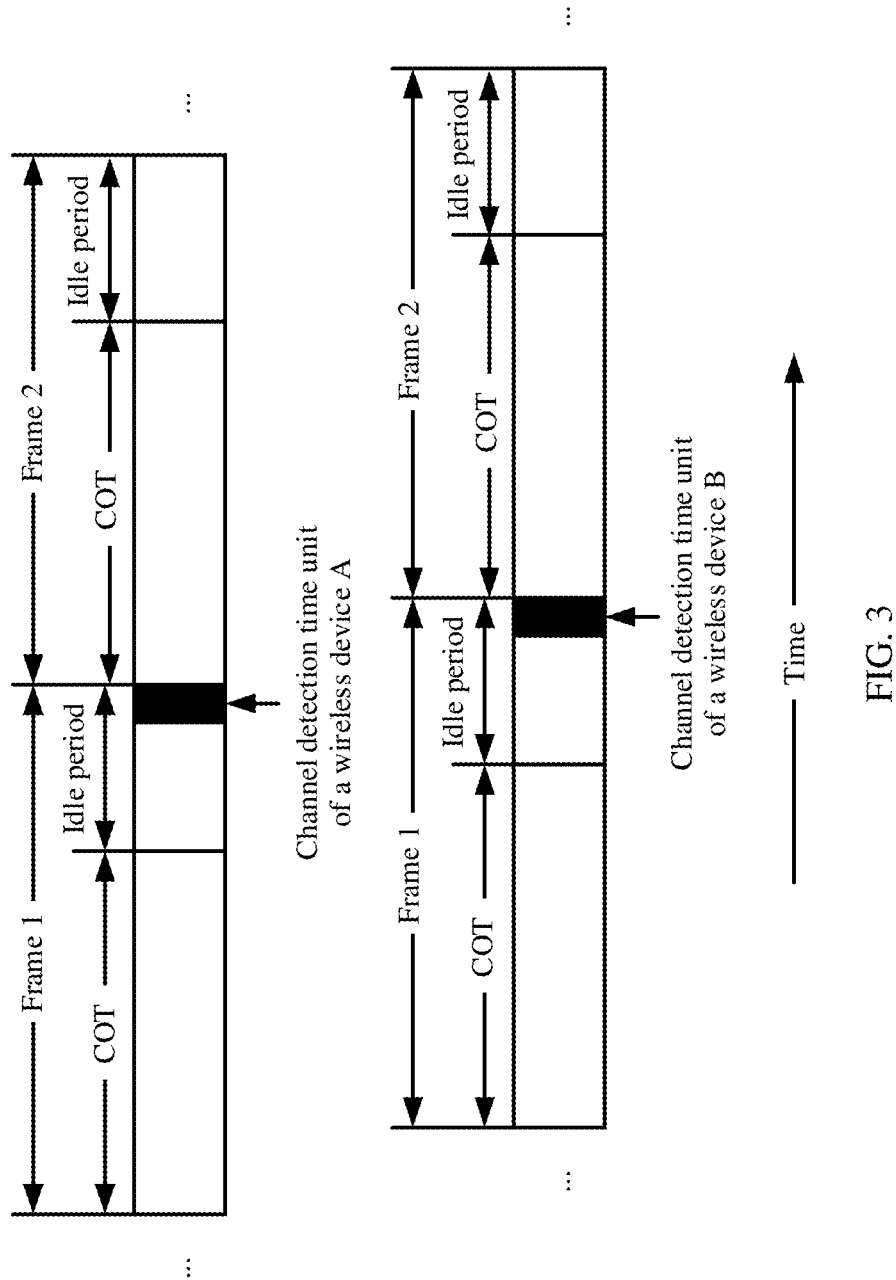
FIG. 3 is a schematic diagram of time domain resource division in another FBE access manner according to an embodiment of this application.

For another example, frame structures of two wireless devices (a wireless device A and a wireless device B) are the same, as shown in FIG. 3, but there is an offset between the frame structures of the two wireless devices in time domain. That is, a channel detection time unit of the wireless device A is located at the end time domain position of the idle period in the frame 1, and a channel detection time unit of the wireless device B is also located at the end time domain position of the idle period in the frame 1. However, because frame boundaries of the wireless device A and the wireless device B have an offset in time domain, the wireless device A detects that no other devices currently occupy a COT in a frame 2, and the wireless device A sends a signal that occupies the frame 2. A time domain position of the channel detection time unit of the wireless device B is later than a time domain position of the channel detection time unit of the wireless device A. Therefore, the wireless device B can detect, in the channel detection time unit, the signal sent by the wireless device A, and then the wireless device B does not receive or send data in the COT in the frame 2. In a scenario in which the wireless device A needs to transmit a large amount of data or the wireless device A needs to transmit data for a long time, because the channel detection time unit of the wireless device A is always earlier than the channel detection time unit of the wireless device B, the wireless device B can always detect the signal sent by the wireless device A. In this way, data that the wireless device A sends blocks channel access of the wireless device B, and the wireless device B cannot send data.

This application provides a communication method for using an unlicensed frequency band, so that a wireless device can determine an available COT by using one or more types of the following signaling (and/or signals): physical layer signaling, a physical layer reference signal, and higher layer signaling.

The physical layer signaling includes one or more types of the following signaling: physical control channel signaling and physical broadcast channel signaling.

The physical layer reference signal may be one or more types of the following reference signals: a synchronization reference signal, a demodulation reference signal (DMRS), and a phase-tracking reference signal (PT-RS), a time-frequency tracking reference signal (T-RS) and a channel state information reference signal (CSI-RS).

The demodulation reference signal may be one or more types of the following demodulation reference signals: a physical control channel demodulation reference signal, a broadcast channel demodulation reference signal, and a physical shared channel demodulation reference signal.

The synchronization signal includes a primary synchronization signal and/or a secondary synchronization signal.

The higher layer signaling includes one or more types of the following signaling: system broadcast information and UE-dedicated RRC signaling.

On the other hand, a wireless device is configured with (or pre-allocated or pre-set) an exclusive COT, or an exclusive frame. A COT in the exclusive frame is an exclusive COT of the wireless device. The exclusive frame and exclusive COT represent a same concept, and may be interchangeably used in the following.

In this way, it can be ensured that when one or more wireless devices in a communications network cannot occupy a detected idle COT, the wireless devices can transmit data at least in exclusive COTs of the wireless devices respectively, thereby ensuring data transmission reliability. For example, for the foregoing case in which one wireless device is always blocked by another wireless device, configuring a wireless device with an exclusive COT can avoid or reduce a problem that a data service of the wireless device cannot be transmitted when the wireless device is blocked for a long time. Optionally, the wireless device does not need to detect or sense a channel occupation status before a start time domain position of an exclusive COT of the wireless device. In this way, a case in which the wireless device cannot transmit data in the exclusive COT of the wireless device because the wireless device detects or senses a signal sent by another wireless device can be avoided, thereby ensuring data transmission reliability. Optionally, the wireless device needs to detect or sense a channel occupation status before a start time domain position of a non-exclusive COT of the wireless device.

If the wireless device determines to use the exclusive COT of the wireless device, the wireless device sends indication information before the COT, to indicate whether the COT is occupied (or whether the COT is to be occupied, or whether the COT is an exclusive COT, or whether the COT can be shared).

Alternatively, if the wireless device determines to use the exclusive COT of the wireless device, the wireless device does not send indication information before the COT. The indication information is used to indicate that the exclusive COT is not occupied by the wireless device.

Alternatively, if the wireless device determines not to use the exclusive COT of the wireless device, the wireless device sends indication information before the COT, to indicate that the COT can be used by another wireless device.

Alternatively, if the wireless device determines not to use the exclusive COT of the wireless device, the wireless device does not send indication information before the COT. The indication information is used to indicate that the exclusive COT is occupied by the wireless device.

When determining that the COT can be used, another wireless device performs CCA or channel detection. When determining that the COT is occupied, another wireless device does not perform CCA and channel detection anymore. Therefore, a waste of spectrum resources caused by a same detected time domain position is avoided, and data transmission reliability of the wireless device when the wireless device shares a spectrum is ensured. That is, a case in which another wireless device cannot use a spectrum resource because one wireless device excessively uses the spectrum resource is avoided. In addition, because wireless devices that interfere with each other do not succeed in contending for the spectrum resource at the same time, the foregoing solution can further improve resource utilization, ensure data transmission reliability, and improve frequency domain resource sharing efficiency.

As shown in FIG. 4, the method 400 includes the following steps.

S410. A first wireless device receives first indication information in a first time unit, where the first indication information is used to indicate that a second time unit is used by a second wireless device to transmit data in the second time unit, or the first indication information is used to indicate that a second time unit is not used by a second wireless device to transmit data in the second time unit, or the first indication information is used to indicate whether a second time unit is used by a second wireless device to transmit data in the second time unit, where the second time unit is a preset dedicated time unit of the second wireless device, and a time domain position of the first time unit is before a time domain position of the second time unit. In this application, transmitting data refers to sending data and/or receiving data.

The first indication information may be further understood as the following meaning: The first indication information is used to indicate that the second time unit can be used by the first wireless device to transmit data in the second time unit. Alternatively, the first indication information is used to indicate that the second time unit cannot be used by the first wireless device to transmit data in the second time unit. Alternatively, the first indication information is used to indicate whether the second time unit can be used by the first wireless device to transmit data in the second time unit. Alternatively, the first indication information is used to indicate that the second time unit is a time unit that can be shared. Alternatively, the first indication information is used to indicate that the second time unit is a time unit that cannot be shared. Alternatively, the first indication information is used to indicate whether the second time unit is a time unit that can be shared.

One time unit is referred to as a time unit that can be shared, and indicates that a plurality of wireless devices may occupy a time domain resource and/or a frequency domain resource in the time unit according to a rule (for example, a contention access mechanism). For example, the wireless device determines, by using CCA, whether a channel status is idle. If the wireless device considers that a channel is idle, the wireless device sends a signal (for example, one or more of physical layer signaling, a physical layer reference signal, or higher layer signaling), and the signal indicates that the time unit that can be shared is occupied. If the wireless device determines that a channel is occupied or a channel is busy, the wireless device gives up occupying the time unit that can be shared.

The first time unit may be one or more slots, time domain symbols, or subframes before the second time unit. The second time unit may be a COT, or may be a time domain symbol, a slot, a subframe, or the like. Definitions of the first time unit and the second time unit are merely examples for description. Specific forms of the first time unit and the second time unit are not limited in embodiments of this application.

The second time unit may be one or more slots, or may be one radio frame. A slot is a time unit, and includes 14 or 12 consecutive orthogonal frequency division multiplexing (OFDM) symbols in time domain. Based on different subcarrier widths, duration of one slot decreases as a subcarrier width increases. A radio frame is a time unit, and a length of the radio frame in time domain is 20 milliseconds. One radio frame includes a plurality of slots, and a quantity of slots with different subcarrier widths are different. For example, with a subcarrier width of 15 kHz, one radio frame includes 10 slots. With a subcarrier width of 30 kHz, one radio frame includes 20 slots. With a subcarrier width of 60 kHz, one radio frame includes 40 slots. With a subcarrier width of 120 kHz, one radio frame includes 80 slots. With a subcarrier width of 240 kHz, one radio frame includes 160 slots.

Figure 5:
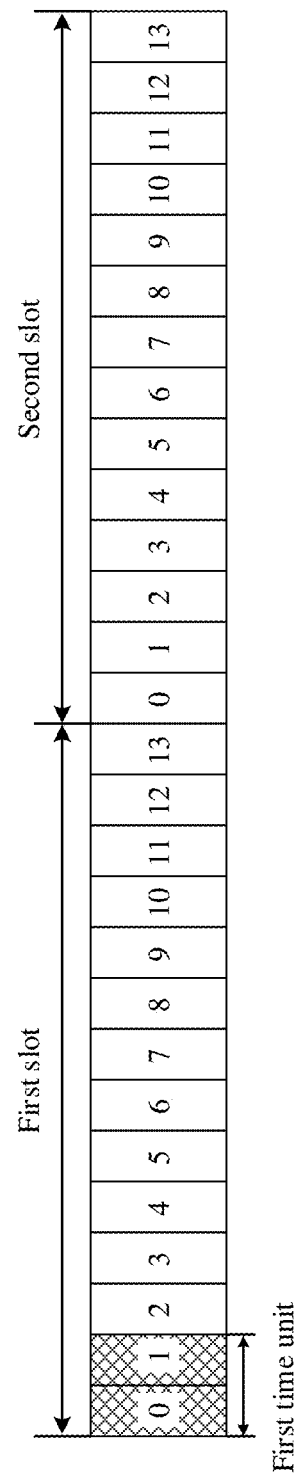
FIG. 5 is a schematic diagram of time domain positions of a first time unit and a second time unit according to an embodiment of this application.

Optionally, the start time domain position of the first time unit may be located at a start time domain position of an idle period. FIG. 5 is a schematic diagram of time domain positions of a first time unit and a second time unit according to an embodiment of this application. A time domain resource shown in FIG. 5 is divided into two slots, namely, a first slot and a second slot. Each slot is divided into 14 OFDM symbols. The first time unit is OFDM symbols whose OFDM numbers are 0 and 1 in the first slot, and a start slot of the second time unit is the second slot, where a slot number of the first slot is n, and a slot number of the second slot is n+1. If the second time unit is a radio frame, the second time unit may include 10, 20, 40, 80, or 160 slots based on different subcarrier widths, or the second time unit may include 9, 19, 39, 79, or 159 slots.

Optionally, an end time domain position of the first time unit is located at a start time domain position of an idle period.

For example, the first time unit is OFDM symbols whose OFDM numbers are 12 and 13 in the first slot, and a start slot of the second time unit is the second slot, where a slot number of the first slot is n, and a slot number of the second slot is n+2. If the second time unit is a radio frame, the second time unit may include 10, 20, 40, 80, or 160 slots based on different subcarrier widths, or the second time unit may include 9, 19, 39, 79, or 159 slots.

In the method 400, the first indication information may have different representation forms.

In an optional implementation, the first indication information may be carried in downlink control information (DCI), and the downlink control information is in a common search space. The first indication information may be carried in a field of the DCI. Content indicated by the first indication information may be represented by using different values of fields of the DCI. For example, if a value of a field of the DCI is a first value (for example, 1), the first indication information indicates that the second time unit is not used by the second wireless device to transmit data, or the second time unit can be used by the first wireless device to transmit data, or the second time unit is a time unit that can be shared. If a value of the first indication information in the DCI is a second value (for example, 0), the first indication information indicates that the second time unit is used by the second wireless device to transmit data, or the second time unit cannot be used by the first wireless device to transmit data, or the second time unit is a time unit that cannot be shared.

In another optional implementation, the first indication information is carried in a reference signal sequence. For example, when the second wireless device sends a first reference signal, first indication information carried in the first reference signal indicates that the second time unit is a time unit that cannot be shared. Alternatively, when the second wireless device sends a second reference signal, first indication information carried in the second reference signal indicates that the second time unit is a time unit that can be shared.

The first wireless device has different processing manners according to the content indicated by the first indication information. That is, the first wireless device may perform the following step 420 or step 430. Step 420 and step 430 are both optional steps.

Step 420. The first wireless device performs channel detection and/or CCA in a third time unit, where the first indication information indicates that the second time unit is not used by the second wireless device to transmit data, or the second time unit can be used by the first wireless device to transmit data, or the second time unit is a time unit that can be shared, where a start time domain position of the third time unit is after the time domain position of the first time unit, and the start time domain position of the third time unit is before the time domain position of the second time unit.

The third time unit may be a slot, an OFDM symbol, or a subframe, or may be another time unit. A specific form of the third time unit is not limited in embodiments of this application.

The first wireless device may determine the third time unit in the following two manners.

Figure 6:
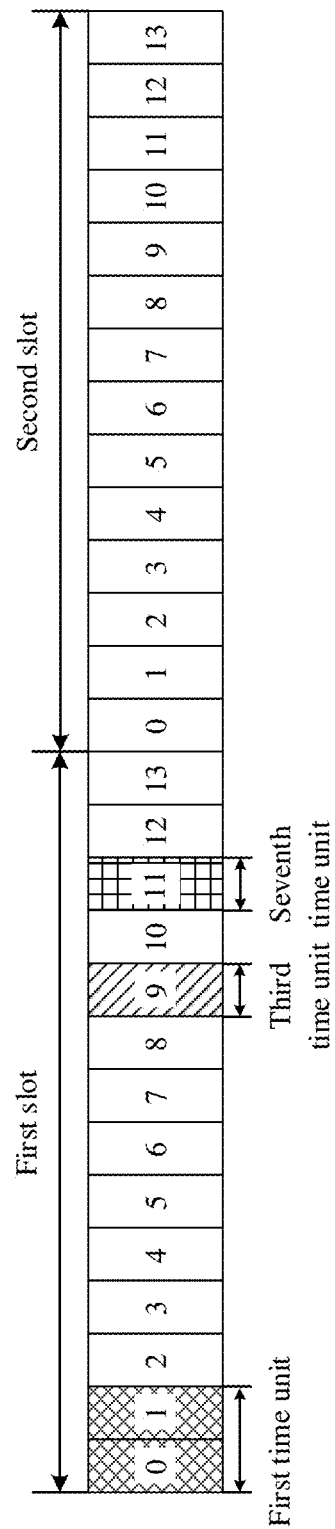
FIG. 6 is a schematic diagram of a time domain position of a third time unit according to an embodiment of this application.

Manner 1:

The first wireless device may randomly determine the third time unit in a plurality of time units. One slot includes a plurality of time units that can be used for the channel detection and/or the CCA, and the plurality of time units do not overlap in time domain, or OFDM symbol sequence numbers of the plurality of time units are different. FIG. 6 is a schematic diagram of a time domain position of a third time unit according to an embodiment of this application. A time domain resource shown in FIG. 6 is divided into two slots, namely, a first slot and a second slot. Each slot is divided into 14 OFDM symbols. A time domain length of the time unit that can be used for the channel detection and/or the CCA is one OFDM symbol. In one slot, any one of time units whose OFDM symbol numbers are 7, 8, 9, 10, 11, 12, and 13 may be used as the time unit used for the channel detection and/or the CCA. Different wireless devices determine different time units used for the channel detection and/or the CCA. The third time unit determined by the first wireless device may be a time unit whose OFDM symbol number is 9 in the first slot.

Manner 2:

A plurality of time units used for the channel detection and/or the CCA may be configured by using higher layer signaling, or may be predefined, or may be in a correspondence with a frame period. In other words, the first wireless device may determine, based on the frame period, the plurality of time units used for the channel detection and/or the CCA.

For example, the higher layer signaling includes configuration information of the frame period, and the first wireless device obtains the configuration information of the frame period in the higher layer signaling. If the frame period is 10 milliseconds, a time domain length of the plurality of time units used for the channel detection and/or the CCA may be 0.5 milliseconds. If the frame period is 5 milliseconds, a time domain length of the plurality of time units used for the channel detection and/or the CCA may be 0.25 milliseconds. The plurality of time units used for the channel detection and/or the CCA may be one or more time units. A time granularity of the plurality of time units may be a preset time granularity. The time granularity is not limited in embodiments of this application. For example, the plurality of time units may be a plurality of OFDM symbols or a plurality of slots in one frame.

Optionally, the third time unit and the first time unit may be located in a same slot or different slots.

In an optional implementation, there is also a third wireless device in a communications system in which the first wireless device and the second wireless device are located. The third wireless device obtains the first indication information, and determines, based on the first indication information, that the second time unit is not used by the second wireless device to transmit data, or the second time unit can be used by the third wireless device to transmit data, or the first indication information is used to indicate that the second time unit is a time unit that can be shared. The third wireless device determines a seventh time unit in the plurality of time units that can be used for the channel detection and/or the CCA. For example, as shown in FIG. 6, the third wireless device obtains the first indication information in the first time unit, and determines that the second time unit can be shared. In this case, the third wireless device may determine that an OFDM symbol whose OFDM symbol number is 11 in the first slot is the seventh time unit. The seventh time unit is used by the third wireless device to perform the channel detection and/or the CCA.

Optionally, the wireless device may determine, based on a priority of data transmission, a time domain position of the time unit used for the channel detection and/or the CCA. If a priority of data transmission of the first wireless device is higher than a priority of data transmission of the third wireless device, a time unit (namely, the third time unit) in which the first wireless device performs the channel detection and/or the CCA is earlier than a time unit in which the third wireless device performs the channel detection and/or the CCA in the time domain position (namely, the seventh time unit). As shown in FIG. 5, if the priority of data transmission of the first wireless device is higher than a priority of data transmission of the second wireless device, the time unit in which the first wireless device performs the channel detection and/or the CCA is an OFDM symbol whose OFDM symbol number is 9 in the first slot, the time unit in which the third wireless device performs the channel detection and/or the CCA is an OFDM symbol whose OFDM symbol number is 11 in the first slot, and the OFDM symbol whose OFDM symbol number is 9 is earlier than the OFDM symbol whose OFDM symbol number is 11 in time domain. The priority of the data transmission may be determined based on a parameter of the data transmission. The parameter of the data transmission includes one or more of the following parameters: a quantity of time domain symbols occupied by the data transmission, a time domain interval from an end time of downlink data transmission to a start time of uplink acknowledgment information (for example, acknowledgment (ACK) or negative acknowledgment (NACK) information) transmission, or a delay of a service.

For example, a smaller quantity of time domain symbols occupied by data transmission indicates a higher priority, and a larger quantity of time domain symbols occupied by data transmission indicates a lower priority. Alternatively, a smaller time domain interval from the end time of the downlink data transmission to the start time of sending the uplink acknowledgment information indicates a higher priority, and a larger time domain interval indicates a lower priority. Alternatively, a lower delay requirement of the service indicates a higher priority, and a higher delay requirement of the service indicates a lower priority.

The foregoing describes in detail an embodiment in which the first indication information indicates that the first wireless device can transmit data in the second time unit. In this embodiment, a dedicated time unit is allocated to the wireless device, to ensure transmission reliability of the wireless device and avoid the problem described in the background. Dedicated time units of different wireless devices do not overlap, or partially overlap, or completely overlap in time domain. Relationships among the dedicated time units of different wireless devices in time domain resources are related to interference among the wireless devices. If there is weak channel interference or signal interference among different wireless devices, the dedicated time units of the different wireless devices may partially or completely overlap in time domain. If there is strong channel interference or signal interference among different wireless devices, the dedicated time units of the different wireless devices do not overlap in time domain.

In some cases, for example, a current wireless communications environment of the second wireless device is relatively good. Alternatively, a priority of data that is currently to be transmitted by the second wireless device is relatively low. Alternatively, the first wireless device needs to transmit emergency data. The second wireless device may indicate that the second time unit can be used by another wireless device (for example, the first wireless device). Alternatively, the second wireless device indicates that the second time unit can be shared. Therefore, resource utilization of the unlicensed frequency band can be improved. The second wireless device may send indication information that carries an identifier of the wireless device or a group identifier of the wireless device. Correspondingly, when receiving the indication information including an identifier of the first wireless device, the first wireless device determines that the first wireless device can use the second time unit. When receiving the indication information not including an identifier of the first wireless device, the first wireless device determines that the first wireless device cannot use the second time unit.

If the first indication information indicates that the first wireless device cannot transmit data by using the second time unit, the first wireless device needs to perform step 430.

Step 430. The first wireless device does not perform the channel detection and/or the CCA before the second time unit, where the first indication information is used to indicate that the second time unit is used by the second wireless device to transmit data, or the second time unit cannot be used by the first wireless device to transmit data, or the second time unit is a time unit that cannot be shared.

If the first indication information is the content described in step 430, the first wireless device does not need to perform the channel detection and/or the CCA before the start time domain position of the second time unit. In this solution, the first wireless device may reduce frequency of the channel detection and/or the CCA, thereby reducing energy consumption of the first wireless device. In addition, for the second wireless device, the second wireless device indicates that the second time unit cannot be shared, so that the second time unit is a dedicated time unit of the second wireless device. Because there is no other wireless device in the second time unit, interference received by the second wireless device is further reduced, and spectral efficiency of data transmission of the second wireless device is improved. In addition, data transmission reliability of the second wireless device may be further improved, because there are a plurality of predefined resources in the system that may be used as time units dedicated to the second wireless device.

In some cases, the second wireless device may send the second indication information. The second indication information is used to indicate that the second time unit cannot be shared. For example, if a terminal device associated with the second wireless device needs to transmit emergency data, and the second wireless device has sent first indication information indicating that the second time unit can be shared, the second wireless device may send the second indication information.

In the foregoing embodiment, after receiving the first indication information, the first wireless device may determine, based on the first indication information, that the second time unit is not used by the second wireless device to transmit data, or the second time unit is a time unit that can be shared. Then, the first wireless device receives or detects the second indication information in a fourth time unit. The second indication information is used to indicate that the second time unit is used by the second wireless device to transmit data, or the second time unit is a time unit that cannot be shared. An end time domain position of the fourth time unit is before an end time domain position of the second time unit. Optionally, the end time domain position of the fourth time unit is a start time domain position of the second time unit.

In some other cases, the second wireless device may send the second indication information. The second indication information is used to indicate that the second time unit can be shared. For example, if the second wireless device has sent first indication information indicating that the second time unit cannot be shared, but the second wireless device determines not to transmit data, the second wireless device may send the second indication information.

In the foregoing embodiment, after receiving the first indication information, the first wireless device may determine, based on the first indication information, that the second time unit is used by the second wireless device to transmit data, or the second time unit is a time unit that cannot be shared. Then, the first wireless device receives or detects the second indication information in the fourth time unit. The second indication information is used to indicate that the second time unit is not used by the second wireless device to transmit data, or the second time unit is a time unit that can be shared. An end time domain position of the fourth time unit is before an end time domain position of the second time unit. Optionally, the end time domain position of the fourth time unit is a start time domain position of the second time unit.

In an optional embodiment, a plurality of wireless devices that receive the first indication information determine that the second time unit can be shared, but there is still a contention conflict between the plurality of wireless devices. In this case, the second indication information may indicate that all wireless devices other than the second wireless device can use the second time unit. Alternatively, the second indication information indicates that a specific wireless device including the second wireless device can use the second time unit. For example, the second indication information includes an identifier of a wireless device that can use the second time unit, or the second indication information includes a group identifier of a wireless device that can use the second time unit.

For example, the second indication information is carried in the downlink control information. The downlink control information may include the identifier of the wireless device that can use the second time unit. If the first wireless device obtains the identifier of the first wireless device from the downlink control information, the first wireless device determines that the second time unit can be used. Otherwise, the first wireless device determines that the second time unit cannot be used.

For another example, the second indication information may be a scrambling code on cyclic redundancy check (CRC) of the downlink control information. The first wireless device blindly detects the DCI in the fourth time unit. The CRC of the DCI is scrambled by using an exclusive identifier of the first wireless device. If the first wireless device detects the downlink control information scrambled by using the exclusive identifier of the first wireless device, the first wireless device determines that the first wireless device can use the second time unit. Alternatively, if the first wireless device detects no downlink control information scrambled by using the exclusive identifier of the first wireless device, the first wireless device determines that the first wireless device cannot use the second time unit.

For still another example, the second indication information is carried in a scrambling code sequence of the downlink control information. For example, a bit sequence obtained after channel coding and rate matching are performed on the downlink control information may be denoted as $b(0), b(1), \ldots,$ and $b(N-1)$. A generated scrambling code sequence may be denoted as $c(0), c(1), \ldots$. An initial value of the generated scrambling code sequence is $c_{init}$. A scrambled bit sequence is denoted as $b'(0), b'(1), \ldots,$ and $b'(N-1)'$. The scrambling formula is $b'(i)=[b(i)+c(i+\gamma \cdot N)]$ mod 2. N is a length of the bit sequence obtained after the rate matching, $\gamma$ is a real number related to the identifier of the wireless device, mod represents a remainder function, i represents a sequence number, and a value of i is one of 0 to N−1. For still another example, the initial value for the generated scrambling code sequence is determined by the identifier of the wireless device. The initial value of the generated scrambling code sequence $c_{init}$ is a function related to the identifier of the wireless device. If the scrambling formula of the scrambling code sequence of the downlink control information detected by the first wireless device is $b'(i)=[b(i)+c(i+\gamma \cdot N)]$ mod 2, and $\gamma$ is a real number related to the identifier of the first wireless device, the first wireless device determines that the second time unit can be used. If the first wireless device detects that the initial value of the scrambling code sequence of the downlink control information is generated based on the identifier of the first wireless device, the first wireless device determines that the second time unit can be used. If the scrambling formula of the scrambling code sequence of the downlink control information detected by the first wireless device is $b'(i)=[b(i)+c(i+\gamma \cdot N)]$ mod 2, and $\gamma$ is a real number that is not related to the identifier of the first wireless device, the first wireless device determines that the second time unit cannot be used. If the first wireless device detects that the initial value of the scrambling code sequence of the downlink control information is generated not based on the identifier of the first wireless device, the first wireless device determines that the second time unit cannot be used.

For still another example, the second indication information is carried in a reference signal sequence. An initial value of the reference signal sequence is a function related to the ID of the wireless device, and the reference signal sequence is generated based on the initial value. For example, the first wireless device detects the received reference signal sequence based on the reference signal sequence generated based on the identifier of the first wireless device. If the first wireless device detects the reference signal sequence generated based on the identifier of the first wireless device, the first wireless device determines that the first wireless device can use the second time unit. Alternatively, if the first wireless device detects no reference signal sequence generated based on the identifier of the first wireless device, the first wireless device determines that the first wireless device cannot use the second time unit. The reference signal sequence may be at least one of the following reference signal sequences: a downlink control channel reference signal sequence, a broadcast channel reference signal sequence, an uplink or downlink shared channel reference signal sequence, a channel measurement reference signal sequence, a time-frequency synchronization reference signal sequence, or a synchronization signal reference signal sequence.

The foregoing examples are merely examples for description. The identifier of the wireless device carried in the second indication information may be an identifier of one wireless device, or may be a group of identifiers of the wireless devices. This is not limited in embodiments of this application. The indication method of the second indication information is also applicable to the first indication information.

In addition to the foregoing embodiments in which the first wireless device receives the second indication information, the first wireless device may further determine, depending on whether the second indication information is detected, whether the first wireless device can use the second time unit, or the first wireless device may further determine, depending on whether the second indication information is detected, whether the first wireless device performs the channel detection and/or the CCA.

For example, when the first wireless device detects the second indication information in the fourth time unit, the first wireless device determines to perform the channel detection and/or the CCA subsequently. When the first wireless device detects no second indication information in the fourth time unit, the first wireless device determines not to perform the channel detection and/or the CCA.

After obtaining the second indication information in the fourth time unit, the first wireless device may perform the channel detection and/or the CCA in a fifth time unit, to determine whether a channel usage status of the second time unit meets a transmission requirement of the first wireless device. The fifth time unit is located after the fourth time unit, and the fifth time unit is located before the end time domain position of the second time unit.

Figure 7:
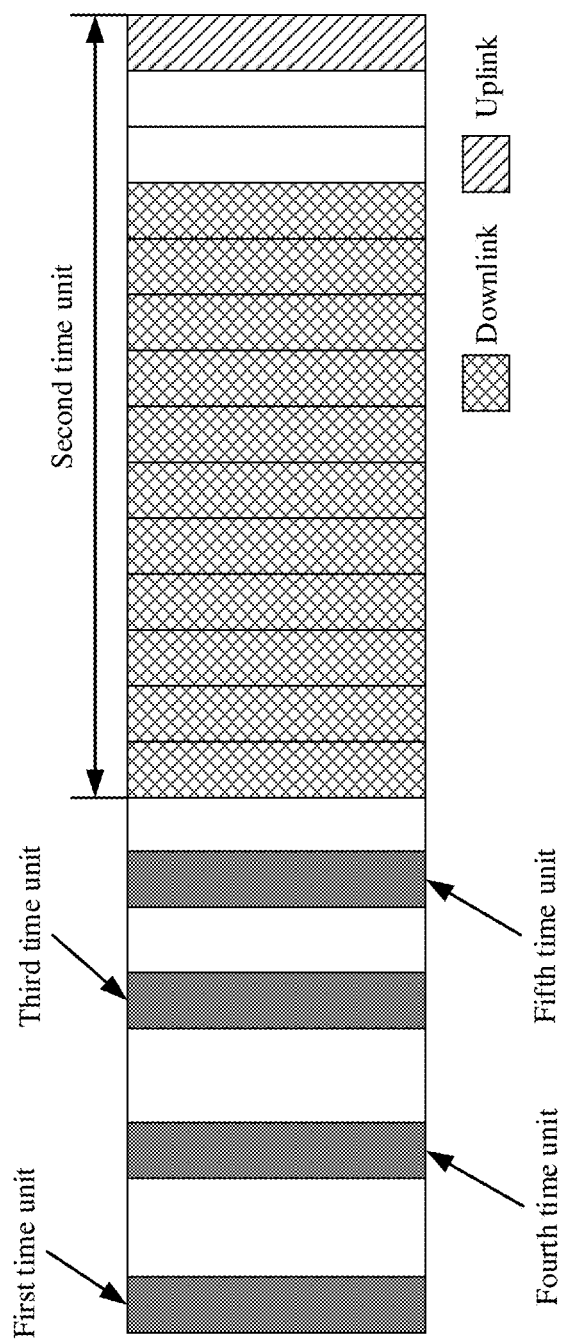
FIG. 7 is a schematic diagram of another communication method for using an unlicensed frequency band according to an embodiment of this application.

FIG. 7 is another example of a communication method for using an unlicensed frequency band according to an embodiment of this application. An example in which the first wireless device is a first base station and the second wireless device is a second base station is used to further describe this application.

A time domain resource shown in FIG. 7 is divided into a plurality of time units. A second time unit includes a part used for uplink transmission and a part used for downlink transmission. The second time unit is a time unit used by the second base station to transmit data. The second time unit includes a plurality of OFDM symbols, a part of OFDM symbols is used for downlink transmission, a part of OFDM symbols is used for uplink transmission, and two OFDM symbols between OFDM symbols used for downlink transmission and an OFDM symbol used for uplink transmission are used for uplink-downlink switching. The structure of the second time unit is merely an example for description. The second time unit may be alternatively used only for uplink transmission or only for downlink transmission.

The second base station sends first indication information in a first time unit, to indicate that the second time unit is occupied. A third time unit is, for example, a preset time unit in which the first base station performs CCA. After obtaining the first indication information, the first base station does not perform the CCA in the third time unit anymore until a time unit to which the first base station belongs arrives.

If the second base station determines not to exclusively use the second time unit anymore, the second base station sends second indication information in a fourth time unit, and the second indication information indicates that the second time unit can be used. After the first base station obtains the second indication information, if the first base station determines to use the second time unit, the first base station may perform the CCA in a fifth time unit, to determine that the second time unit is not used by another wireless device.

It should be noted that the third time unit and the fifth time unit may be a same time unit, or may be different time units. For example, if a time domain position of the fourth time unit is before a time domain position of the third time unit, the first wireless device can directly perform the CCA in the third time unit, that is, the third time unit overlaps with the fifth time unit. For another example, if a time domain position of the fourth time unit is after a time domain position of the third time unit, the first wireless device cannot perform the CCA by using the third time unit, and the first wireless device can perform the CCA in the fifth time unit. The fifth time unit may be a preset time unit, or may be a time unit determined by the first wireless device according to a rule.

The foregoing describes a method in which the first wireless device is used as a device that receives the first indication information to perform communication by using an unlicensed frequency band. It may be understood that the first wireless device is not always used as the device that receives the first indication information to perform the communication by using the unlicensed frequency band. For example, when a dedicated time unit of the first wireless device arrives, the first wireless device may send indication information, to indicate that the dedicated time unit is occupied and cannot be used by another wireless device. In this case, after receiving the indication information, the second wireless device does not contend for the dedicated time unit anymore. For a method for sending the indication information by the first wireless device, refer to the following example in which the second wireless device sends the first indication information.

Figures 8, 9:
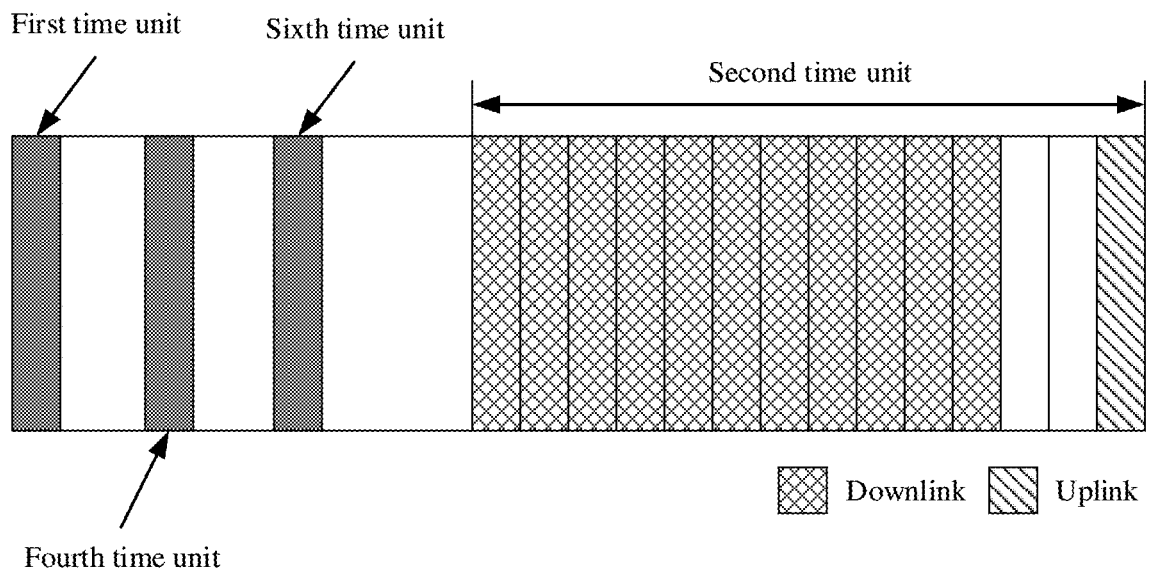
FIG. 8 is a schematic diagram of still another communication method for using an unlicensed frequency band according to an embodiment of this application.
FIG. 9 is a schematic diagram in which a second wireless device contends for a right of use of a second time unit according to an embodiment of this application.

As shown in FIG. 8, the method 800 includes the following steps.

S810. A second wireless device obtains first indication information, where the first indication information is used to indicate the second wireless device to transmit data in a second time unit, or the first indication information is used to indicate the second wireless device not to transmit data in a second time unit, or the first indication information is used to indicate whether the second wireless device transmits data in a second time unit, where the second time unit is a preset time unit used by the second wireless device to transmit data.

S820. The second wireless device sends the first indication information in a first time unit, where a time domain position of the first time unit is before a time domain position of the second time unit.

A person skilled in the art may know that the "second wireless device", the "first indication information", the "first time unit", and the "second time unit" in the method 800 may be equivalent to corresponding nouns in the method 400 in FIG. 4. In addition, in the method 800, a step in which the second wireless device sends the first indication information corresponds to a step in which the first wireless device receives the first indication information in the method 400. For brevity, details are not described herein again.

In S810, the first indication information may be information generated by the second wireless device, information received by the second wireless device from another device, or information read by the second wireless device from a storage medium.

The second time unit is a dedicated time unit of the second wireless device, and the second wireless device may use different processing manners depending on whether the second wireless device uses the second time unit to transmit data.

In an optional implementation, if the second wireless device determines to use the second time unit to transmit data, the second wireless device may use the following processing manners.

Processing Manner 1:

The second wireless device obtains and sends the first indication information, and the first indication information is used to indicate the second wireless device to use the second time unit to transmit data. It should be noted that the first indication information may indicate, in a plurality of manners, the second wireless device to use the second time unit to transmit data. For example, the first indication information indicates that the second time unit is a time unit that cannot be shared, or the first indication information indicates that a wireless device except the second wireless device is prohibited from using the second time unit. A specific form of the first indication information is not limited in embodiments of this application.

After sending the first indication information, the second wireless device may receive and send data in the dedicated time unit (namely, the second time unit) of the second wireless device. In this way, the second wireless device may receive and send data in a time unit in which transmission reliability is ensured, thereby improving reliability of communication performed by the wireless device by using the unlicensed frequency band.

Processing Manner 2:

The second wireless device does not send the first indication information, and the first indication information is used to indicate the second wireless device not to use the second time unit to transmit data. It should be noted that the first indication information may indicate, in a plurality of manners, the second wireless device not to use the second time unit to transmit data. For example, the first indication information indicates that the second time unit is a time unit that can be shared, or the first indication information indicates that a wireless device except the second wireless device is allowed to use the second time unit. A specific form of the first indication information is not limited in embodiments of this application.

A wireless device (for example, the first wireless device) except the second wireless device may detect the first indication information in a preset time unit (for example, the first time unit). If the first wireless device detects no first indication information, the first wireless device determines that the first wireless device cannot use the second time unit.

After determining not to send the first indication information, the second wireless device may receive and send data in the dedicated time unit (namely, the second time unit) of the second wireless device. In this way, the second wireless device may receive and send data in a time unit in which transmission reliability is ensured, thereby improving reliability of communication performed by the wireless device by using the unlicensed frequency band.

In another optional implementation, the second wireless device determines not to use the second time unit to transmit data. For example, if a current wireless communications environment of the second wireless device is relatively good, a priority of data currently to be transmitted by the second wireless device is relatively low, or the first wireless device needs to transmit emergency data, the second wireless device may indicate that the second time unit can be used by another wireless device (for example, the first wireless device). Therefore, utilization of resource transmission by using an unlicensed frequency band and flexibility of transmission by using the unlicensed frequency band are improved. The second wireless device may indicate, in the following processing manner, the another wireless device to use the second time unit.

Processing Manner 3:

The second wireless device obtains and sends the first indication information, and the first indication information is used to indicate the second wireless device not to use the second time unit to transmit data. It should be noted that the first indication information may indicate, in a plurality of manners, the second wireless device not to use the second time unit to transmit data. For example, the first indication information indicates that the second time unit is a time unit that can be shared, or the first indication information indicates that a wireless device except the second wireless device is allowed to use the second time unit. A specific form of the first indication information is not limited in embodiments of this application.

A wireless device (for example, a first wireless device) except the second wireless device may detect the first indication information in a preset time unit (for example, a first time unit). If the first wireless device detects the first indication information, the first wireless device determines that the first wireless device can use the second time unit. The first wireless device may choose to perform channel detection and/or CCA in a third time unit.

Processing Manner 4:

The second wireless device does not send the first indication information, and the first indication information is used to indicate the second wireless device uses the second time unit to transmit data. It should be noted that the first indication information may indicate, in a plurality of manners, the second wireless device to use the second time unit to transmit data. For example, the first indication information indicates that the second time unit is a time unit that cannot be shared, or the first indication information indicates that a wireless device except the second wireless device is prohibited from using the second time unit. A specific form of the first indication information is not limited in embodiments of this application.

A wireless device (for example, a first wireless device) except the second wireless device may detect the first indication information in a preset time unit (for example, a first time unit). If the first wireless device detects no first indication information, the first wireless device determines that the first wireless device can use the second time unit. The first wireless device may choose to perform channel detection and/or CCA in a third time unit.

In an optional implementation, when the first indication information indicates that the second wireless device does not use the second time unit to transmit data, or the first indication information indicates that the second time unit can be shared, the method 800 further includes:

The second wireless device sends second indication information in a fourth time unit, where the second indication information is used to indicate that the first wireless device cannot transmit data in the second time unit, or the second indication information is used to indicate that the second time unit cannot be shared, where an end time domain position of the fourth time unit is before an end time domain position of the second time unit.

In some cases, for example, if the second wireless device has sent the first indication information indicating that the second time unit can be shared, and the second wireless device needs to transmit emergency data, the second wireless device may send the second indication information, and the second indication information indicates that the second time unit cannot be shared.

In some other cases, for example, if the second wireless device has sent the first indication information indicating that the second time unit cannot be shared, and the second wireless device determines not to use the second time unit anymore, the second wireless device may send the second indication information, and the second indication information is used to indicate that the second time unit can be shared.

In another optional implementation, when the first indication information indicates that the second wireless device uses the second time unit to transmit data, or the first indication information indicates that the second time unit cannot be shared, the method 800 further includes:

The second wireless device sends second indication information in a fourth time unit, where the second indication information is used to indicate that the first wireless device can transmit data in the second time unit, or the second indication information is used to indicate that the second time unit can be shared, where an end time domain position of the fourth time unit is before an end time domain position of the second time unit.

The "second indication information" in the method 800 may be equivalent to or refer to the "second indication information" in the method 400. For brevity, details are not described herein again.

That the second wireless device sends the second indication information indicates that the second wireless device shares the second time unit with another wireless device. If the second wireless device further expects to transmit data in the second time unit, the second wireless device needs to contend with the another wireless device (including the first wireless device) for a right of use of the second time unit.

FIG. 9 is a schematic diagram in which a second wireless device contends for a right of use of a second time unit.

A time domain resource shown in FIG. 9 is divided into a plurality of time units. A second time unit includes a part used for uplink transmission and a part used for downlink transmission. The second time unit is used by a second base station (namely, the second wireless device) to transmit data. The second time unit includes a plurality of OFDM symbols, a part of OFDM symbols is used for downlink transmission, a part of OFDM symbols is used for uplink transmission, and two OFDM symbols between OFDM symbols used for downlink transmission and an OFDM symbol used for uplink transmission are used for uplink-downlink switching. The structure of the second time unit is merely an example for description. The second time unit may be alternatively used only for uplink transmission or only for downlink transmission.

The second base station sends first indication information in a first time unit, to indicate that the second time unit is occupied.

If the second base station determines not to exclusively use the second time unit anymore, the second base station sends second indication information in a fourth time unit, and the second indication information indicates that the second time unit can be used by a base station other than the second base station.

After the second indication information is sent, the second base station performs channel detection and/or CCA in a sixth time unit. The sixth time unit may be a preset time unit, or may be a time unit determined by the second wireless device according to a rule. In addition, the sixth time unit may be one or more slots, or may be one or more OFDM symbols. A specific form of the sixth time unit is not limited in embodiments of this application.

Optionally, the method 800 further includes:

The second wireless device determines the second time unit.

The second wireless device may determine the second time unit according to a preset rule, or may obtain higher layer signaling, and determine the second time unit based on the higher layer signaling.

The second wireless device may determine the second time unit before obtaining the first indication information, or may determine the second time unit after obtaining the first indication information. The following uses an example in which the second wireless device is the second base station, to describe an example in which the second wireless device determines the second time unit after obtaining the first indication information.

After the second base station sends the first indication information indicating that the second base station does not transmit data in the second time unit, a terminal device associated with the second base station needs to transmit emergency data. In this case, the second base station may send second indication information indicating that the second time unit cannot be shared. In other words, the second base station determines the second time unit after sending the first indication information.

In an optional implementation, the second wireless device may determine the second time unit from a plurality of candidate-dedicated time units.

The second wireless device may obtain configuration information of the candidate-dedicated time unit or obtain configuration information of a dedicated time unit by using a higher layer parameter. The configuration information of the candidate-dedicated time unit or the configuration information of the dedicated time unit includes one or more of the following information: a period of the candidate-dedicated time unit, a time domain length of the candidate-dedicated time unit, an offset of the candidate-dedicated time unit in time domain, a frequency domain resource corresponding to the candidate-dedicated time unit, and a quantity of consecutive candidate-dedicated time units in one period.

The following configuration manner is also applicable to obtaining the configuration information of the dedicated time unit.

The second wireless device may determine a start time domain position of the candidate-dedicated time unit based on n mod m=0, where n is a slot number in one radio frame, m is a preset value, and mod is a modulo operation.

For example, when a subcarrier spacing is 15 kHz, slots in one radio frame are numbered from 0 to 9. If m is equal to 5, because 0 mod 5 is equal to 0, and 5 mod 5 is equal to 0, the start time domain positions of the candidate-dedicated time unit is the slot 0 and the slot 5.

For another example, when a subcarrier spacing is 15 kHz, slots in one radio frame are numbered from 0 to 9. If m is equal to 10, because 0 mod 10 is equal to 0, the start time domain position of the candidate-dedicated time unit is the slot 0.

For still another example, when a subcarrier spacing is 30 kHz, slots in one radio frame are numbered from 0 to 19. If m is equal to 5, because 0 mod 5 is equal to 0, 5 mod 5 is equal to 0, 10 mod 5 is equal to 0, and 15 mod 5 is equal to 0, the start time domain positions of the candidate-dedicated time unit is the slot 0, the slot 5, the slot 10, and the slot 15.

After determining the start time domain position of the candidate-dedicated time unit, the second wireless device may determine an end time domain position of the candidate-dedicated time unit based on the time domain length of the candidate-dedicated time unit, the offset of the candidate-dedicated time unit in time domain, or the quantity of consecutive candidate-dedicated time units in one period.

Figure 10:
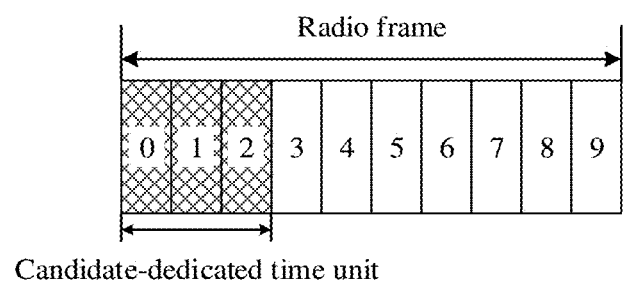
FIG. 10 is a schematic diagram of a method for determining a candidate-dedicated time unit according to an embodiment of this application.

FIG. 10 is a schematic diagram of a method for determining a candidate-dedicated time unit according to an embodiment of this application. In FIG. 10, one radio frame includes 10 slots, and the slots are respectively numbered from 0 to 9.

If the second wireless device determines that a start time domain position of the candidate-dedicated time unit is the slot 0, and the second wireless device determines that duration of the candidate-dedicated time unit is three slots, the second wireless device determines that the candidate-dedicated time unit is the slot 0, the slot 1, and the slot 2 in the radio frame.

Alternatively, if the second wireless device determines that a start time domain position of the candidate-dedicated time unit is the slot 0, and the second wireless device determines that an offset of the candidate-dedicated time unit in time domain is three slots, the second wireless device determines that the candidate-dedicated time unit is the slot 0, the slot 1 and the slot 2 in the radio frame.

Alternatively, if the second wireless device determines that a start time domain position of the candidate-dedicated time unit is the slot 0, and the second wireless device determines that a quantity of consecutive candidate-dedicated time units in one period is three slots, the second wireless device determines that the candidate-dedicated time unit is the slot 0, the slot 1 and the slot 2 in the radio frame.

The slot 0, the slot 1, and the slot 2 are, for example, the second time units described in the method 400 and the method 800.

A period (which may also be referred to as an "access period") of the candidate-dedicated time unit is used to indicate frequency at which the candidate-dedicated time unit appears. For example, if a time domain length of the candidate-dedicated time unit is one radio frame, and the period of the candidate-dedicated time unit is two radio frames, there is one radio frame between two adjacent candidate-dedicated time units. For another example, if the time domain length of the candidate-dedicated time unit is one radio frame, and the period of the candidate-dedicated time unit is one radio frame, there is no interval between every two adjacent candidate-dedicated time units in time domain.

In addition, a granularity of a frequency domain resource corresponding to the candidate-dedicated time unit may be a physical resource block, and one physical resource block includes 12 consecutive subcarriers in frequency domain. Alternatively, a granularity of a frequency domain resource corresponding to the candidate-dedicated time unit may be a bandwidth part (BWP). For example, if configuration information in a higher layer parameter includes a BWP index 0 and a BWP index 2, the frequency domain resources in the candidate-dedicated time unit are frequency domain resources corresponding to the BWP index 0 and the BWP index 2.

In a serving cell, the communications system may configure four BWPs for each wireless device. Each BWP includes consecutive physical resource blocks in frequency domain, and a maximum quantity of physical resource blocks included in one BWP is 275. Each BWP corresponds to one BWP index. In other words, the four BWPs correspond to a BWP index 0, a BWP index 1, a BWP index 2, and a BWP index 3. Resources of different BWP indexes in frequency domain may overlap or partially overlap, or do not overlap at all. Alternatively, a frequency domain resource included in each BWP uses 20 MHz as a frequency domain granularity. In other words, a quantity of physical resource blocks included in each BWP is an integer multiple of 20 MHz in frequency domain. For example, at 15 kHz, a quantity of RBs included in the BWP is 100, 200, 300, or 400. At 30 kHz, a quantity of RBs included in the BWP is 50, 100, 150, or 200. At 60 kHz, a quantity of RBs included in the BWP is 25, 50, 75, or 100. At 120 kHz, a quantity of RBs included in the BWP is 12, 25, 37, or 50. At 240 kHz, a quantity of RBs included in the BWP is 7, 12, or 25.

Optionally, the second wireless device may determine, based on a priority of the wireless device, a candidate-dedicated time unit or a dedicated time unit of the second wireless device, namely, the second time unit.

For example, the second wireless device determines a candidate-dedicated time unit of the second wireless device based on a priority of a service of the second wireless device, and the priority of the service is related to a quantity of time units that are dedicated to another wireless device and that the second wireless device passes through. If an initial priority of the second wireless device is 0, and after one access period ends, a quantity of time units dedicated to another wireless device and passed through by the second wireless device is 1, the priority is 1. If an initial priority of the second wireless device is 0, and after one access period ends, a quantity of time units dedicated to another wireless device and passed through by the second wireless device is 2, the priority is 2. The rest may be deduced by analogy. A larger quantity of time units that are dedicated to the another wireless device and that the second wireless device passes through indicates a higher priority of a service of the second wireless device. In addition, if the second wireless device transmits data in a time unit dedicated to the second wireless device, the priority of the service of the second wireless device is reduced to a lowest priority.

Figure 11:
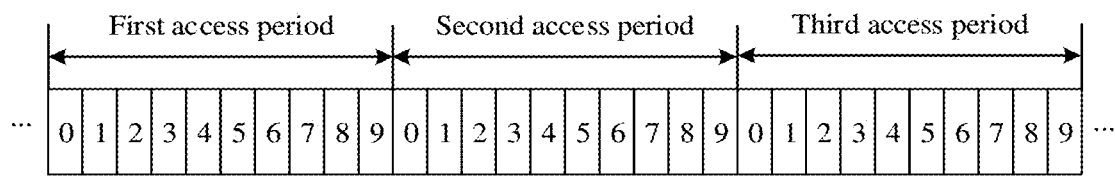
FIG. 11 is a schematic diagram of another method for determining a candidate-dedicated time unit according to an embodiment of this application.

FIG. 11 is another schematic diagram of a method for determining a candidate-dedicated time unit according to an embodiment of this application. In FIG. 11, each access period is one radio frame, one radio frame includes 10 slots, and the slots are respectively numbered from 0 to 9.

As shown in FIG. 11, after a first access period ends, a priority of a service carried by a second wireless device is a lowest priority 0, a priority of a service carried by a second wireless device is a priority 1, and a priority of a service carried by the third wireless device is a priority 2. The priority 2 is a highest priority. After the first access period ends, a third wireless device is a wireless device dedicated to a second access period after the first access period, and the wireless device determines, depending on whether a priority of a service carried by the wireless device is a highest priority, whether a next time unit is a dedicated time unit of the wireless device. After the second access period ends, the priority of the service carried by the third wireless device is reduced to the lowest priority, and the priorities of the services of the second wireless device and the second wireless device are increased. The priority of the service carried by the second wireless device is a priority 1, and the priority of the service carried by the second wireless device is a priority 2. Further, the second wireless device occupies a third access period after the second access period. After the third access period ends, the priority of the service of the second wireless device is a priority 2, and the priority of the service of the second wireless device increases to the highest priority. In this case, the second wireless device determines that a next access period adjacent to the third access period is a dedicated access period of the second wireless device. An initial value and a maximum value of the priority may be configured by using a higher layer parameter, or may be predefined.

Figure 12:
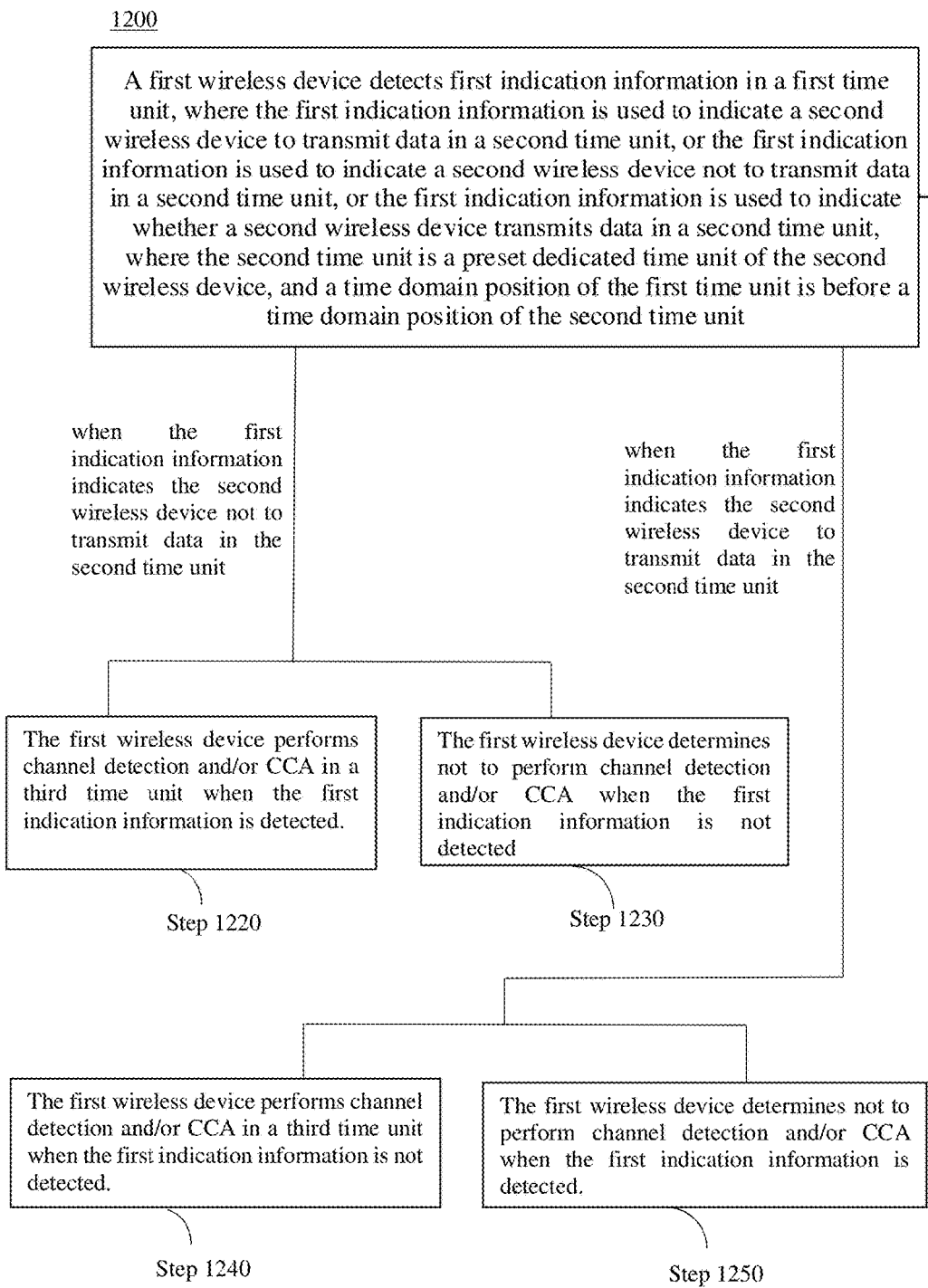
FIG. 12 is a schematic diagram of still another communication method for using an unlicensed frequency band according to an embodiment of this application.

This application further provides a method 1200 for performing communication by using an unlicensed frequency band. Different from the method 400, in the method 1200, first indication information indicates only one type of content. A first wireless device determines, depending on whether the first indication information is detected, whether the first wireless device can use a dedicated time unit (namely, a second time unit) of a second wireless device. As shown in FIG. 12, the method 1200 includes the following steps.

S1210. The first wireless device detects the first indication information in a first time unit, where the first indication information is used to indicate the second wireless device to transmit data in the second time unit, or the first indication information is used to indicate the second wireless device not to transmit data in the second time unit, or the first indication information is used to indicate whether the second wireless device transmits data in the second time unit, where the second time unit is a preset time unit used by the second wireless device to transmit data, and a time domain position of the first time unit is before a time domain position of the second time unit.

Subsequent steps performed by the first wireless device vary with content indicated by the first indication information.

When the first indication information is used to indicate the second wireless device not to transmit data in the second time unit, the first wireless device performs step 1220 or step 1230.

Step 1220. The first wireless device performs channel detection and/or CCA in a third time unit when the first indication information is detected.

Step 1230. The first wireless device determines not to perform channel detection and/or CCA when the first indication information is not detected.

When the first indication information is used to indicate the second wireless device to transmit data in the second time unit, the first wireless device performs step 1240 or step 1250.

Step 1240. The first wireless device performs channel detection and/or CCA in a third time unit when the first indication information is not detected.

Step 1250. The first wireless device determines not to perform channel detection and/or CCA when the first indication information is detected.

The foregoing steps 1220, 1230, 1240 and step 1250 are all optional steps.

The first indication information in the method 1200 is the same as the first indication information in the method 400. For brevity, only one example is provided herein.

For example, there is a correspondence between the first indication information and a reference signal sequence X. If the first wireless device detects the reference signal sequence X in the first time unit, the first wireless device determines that the first indication information is detected. If the first wireless device detects no reference signal sequence X in the first time unit, the first wireless device determines that the first indication information is not detected.

If the first wireless device detects no first indication information, the first wireless device may perform a corresponding step based on content indicated by the first indication information. It should be noted that the content indicated by the first indication information is preset. That is, the first wireless device has known the content indicated by the first indication information before detecting the first indication information.

In conclusion, in the method 1200, one dedicated time unit is allocated to the wireless device (where dedicated time units of a plurality of wireless devices may partially or completely overlap in time domain), to ensure transmission reliability of the wireless device and avoid the problem described in the background. In some cases, for example, if a current wireless communications environment of the second wireless device is relatively good, a priority of data currently to be transmitted by the second wireless device is relatively low, or the first wireless device needs to transmit emergency data, the second wireless device may indicate that the second time unit can be used by another wireless device (for example, a first wireless device). Therefore, utilization of resource transmission by using an unlicensed frequency band and flexibility of transmission by using the unlicensed frequency band are improved.

In addition, the first wireless device determines, depending on whether the first indication information is detected, whether to perform the channel detection and/or the CCA. Therefore, the first wireless device may reduce frequency of the channel detection and/or the CCA, thereby reducing energy consumption of the first wireless device. For the second wireless device, the second wireless device indicates that the second time unit cannot be shared, so that the second time unit is the dedicated time unit of the second wireless device. Because there is no other wireless device in the second time unit, interference received by the second wireless device is further reduced, and spectral efficiency of data transmission of the second wireless device is improved. In addition, data transmission reliability of the second wireless device may be further improved because there are a plurality of predefined resources in the system that may be used as time units dedicated to the second wireless device.

It should be noted that, in the method 1200, after the first wireless device determines whether the second time unit can be shared (or after the first wireless device determines whether the second wireless device transmits data in the second time unit), a subsequent processing manner may be the same as the processing manner in the method 400. For brevity, details are not described herein again.

The foregoing describes in detail example methods for performing communication by using an unlicensed frequency band provided in this application. It may be understood that, to implement the foregoing functions, a communications apparatus for using an unlicensed frequency band includes corresponding hardware structures and/or software modules for performing the functions. A person skilled in the art should be easily understand that, in combination with the examples of units and algorithm steps described in the embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In this application, the communications apparatus for using the unlicensed frequency band may be divided into functional units based on the foregoing example methods. For example, functions may be divided into functional units, or two or more functions may be integrated into one processing unit. The integrated unit may be implemented in a form of hardware, or may be implemented in a form of a software functional unit. It needs to be noted that, in this application, unit division is an example, and is merely a logical function division. During actual implementation, another division manner may be used.

Figure 13:
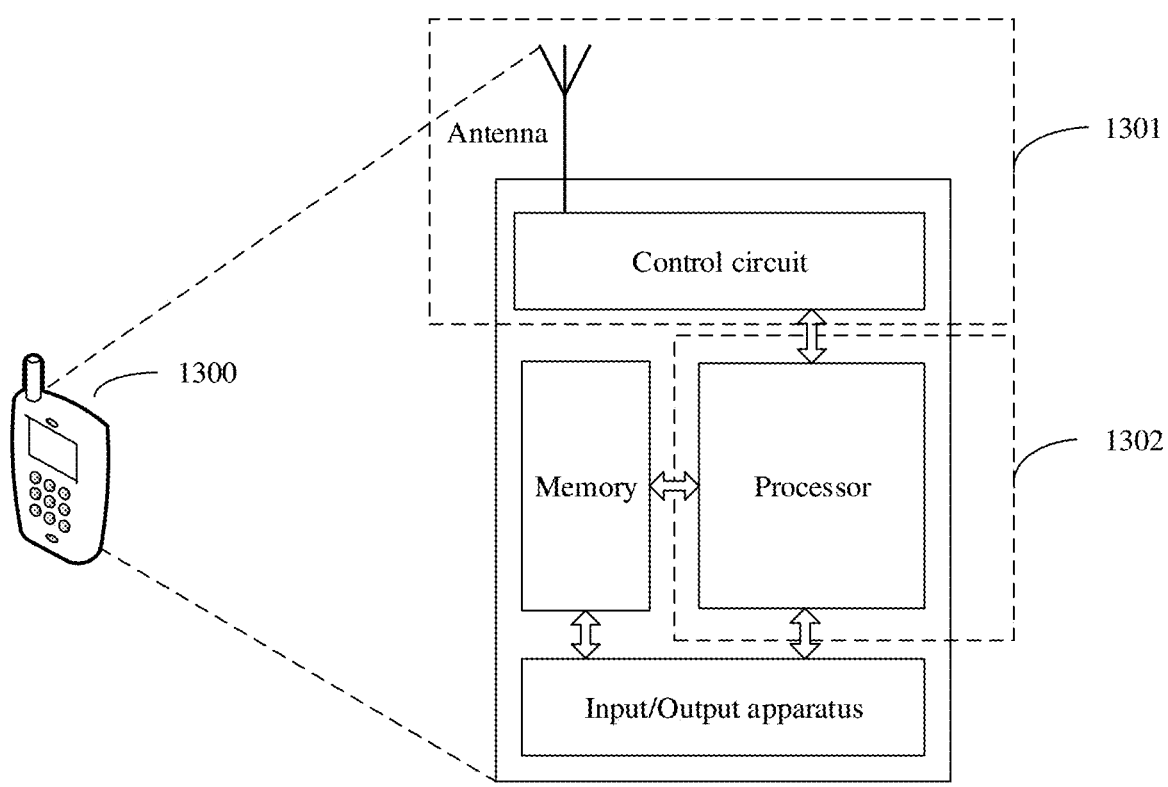
FIG. 13 is a schematic structural diagram of a first wireless device or a second wireless device according to an embodiment of this application.

FIG. 13 is a schematic structural diagram of a terminal device 1300 according to an embodiment of this application. The terminal device may be used in the system shown in FIG. 1, and implement functions of the first network device or the second network device in the foregoing method embodiments. For ease of description, FIG. 13 shows only main components of the terminal device. As shown in FIG. 13, the terminal device 1300 includes a processor, a memory, a control circuit, an antenna, and an input/output apparatus. The processor is mainly configured to: process a communications protocol and communication data, control the entire terminal device, execute a software program, and process data of the software program. For example, the processor is configured to support the terminal device in performing the actions described in the foregoing method embodiments, for example, sending uplink data based on reference signal indication information. The memory is mainly configured to store a software program and data, for example, store various types of indication information described in the foregoing embodiments. The control circuit is mainly configured to: perform conversion between a baseband signal and a radio frequency signal, and process a radio frequency signal. The control circuit and the antenna may be referred to as a transceiver that is mainly configured receive and transmit a radio frequency signal in an electromagnetic wave form. The input/output apparatus, such as a touchscreen, a display screen, or a keyboard, is mainly configured to receive data input by a user and output data to the user.

After the terminal device is powered on, the processor may read the software program in a storage unit, explain and execute instructions of the software program, and process the data of the software program. When data needs to be sent in a wireless manner, after performing baseband processing on the to-be-sent data, the processor outputs a baseband signal to a radio frequency circuit. After performing radio frequency processing on the baseband signal, the radio frequency circuit obtains a radio frequency signal and sends the radio frequency signal to the outside through the antenna in a form of an electromagnetic wave. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data.

A person skilled in the art may understand that for ease of description, FIG. 13 shows only one memory and only one processor. In an actual terminal device, there may be a plurality of processors and a plurality of memories. The memory may also be referred to as a storage medium, a storage device, or the like. This is not limited in embodiments of this application.

In an optional implementation, the processor may include a baseband processor and/or a central processing unit. The baseband processor is mainly configured to process the communications protocol and the communication data. The central processing unit is mainly configured to: control the entire terminal device, execute the software program, and process the data of the software program. Functions of the baseband processor and the central processing unit may be integrated into the processor in FIG. 13. A person skilled in the art may understand that the baseband processor and the central processing unit each may be an independent processor, and are interconnected by using a technology such as a bus. A person skilled in the art may understand that the terminal device may include a plurality of baseband processors to adapt to different network standards, the terminal device may include a plurality of central processing units to improve a processing capability of the terminal device, and components of the terminal device may be connected through various buses. The baseband processor may also be expressed as a baseband processing circuit or a baseband processing chip. The central processing unit may also be expressed as a central processing circuit or a central processing chip. A function of processing the communications protocol and the communication data may be built in the processor, or may be stored in the storage unit in a form of a software program. The processor executes the software program to implement a baseband processing function.

In this embodiment of this application, an antenna and a control circuit that have a receiving and sending function may be considered as a transceiver unit 1301 of the terminal device 1300. For example, the transceiver unit 1301 is configured to support the terminal device in performing the receiving function shown in FIG. 4, or is configured to support the terminal device in performing the sending function shown in FIG. 8, or is configured to support the terminal device in performing the detection function shown in FIG. 12. The processor having a processing function is considered as a processor 1302 of the terminal device 1300. As shown in FIG. 13, the terminal device 1300 includes the transceiver unit 1301 and the processor 1302. The transceiver unit 1301 may also be referred to as a transceiver, a transceiver machine, a transceiver apparatus, or the like. Optionally, a component configured to implement a receiving function in the transceiver unit 1301 may be considered as a receiving unit, and a component configured to implement a sending function in the transceiver unit 1301 may be considered as a sending unit. In other words, the transceiver unit 1301 includes the receiving unit and the sending unit. The receiving unit may also be referred to as a receiver, an input port, a receiving circuit, or the like, and the sending unit may be referred to as a transmitter, a transmitting circuit, or the like.

The processor 1302 may be configured to execute instructions stored in the memory, to control the transceiver unit 1301 to receive a signal and/or send a signal, to implement a function of the terminal device in the foregoing method embodiments. In an implementation, it may be considered that a function of the transceiver unit 1301 is implemented by using a transceiver circuit or a special-purpose transceiver chip.

Figure 14:
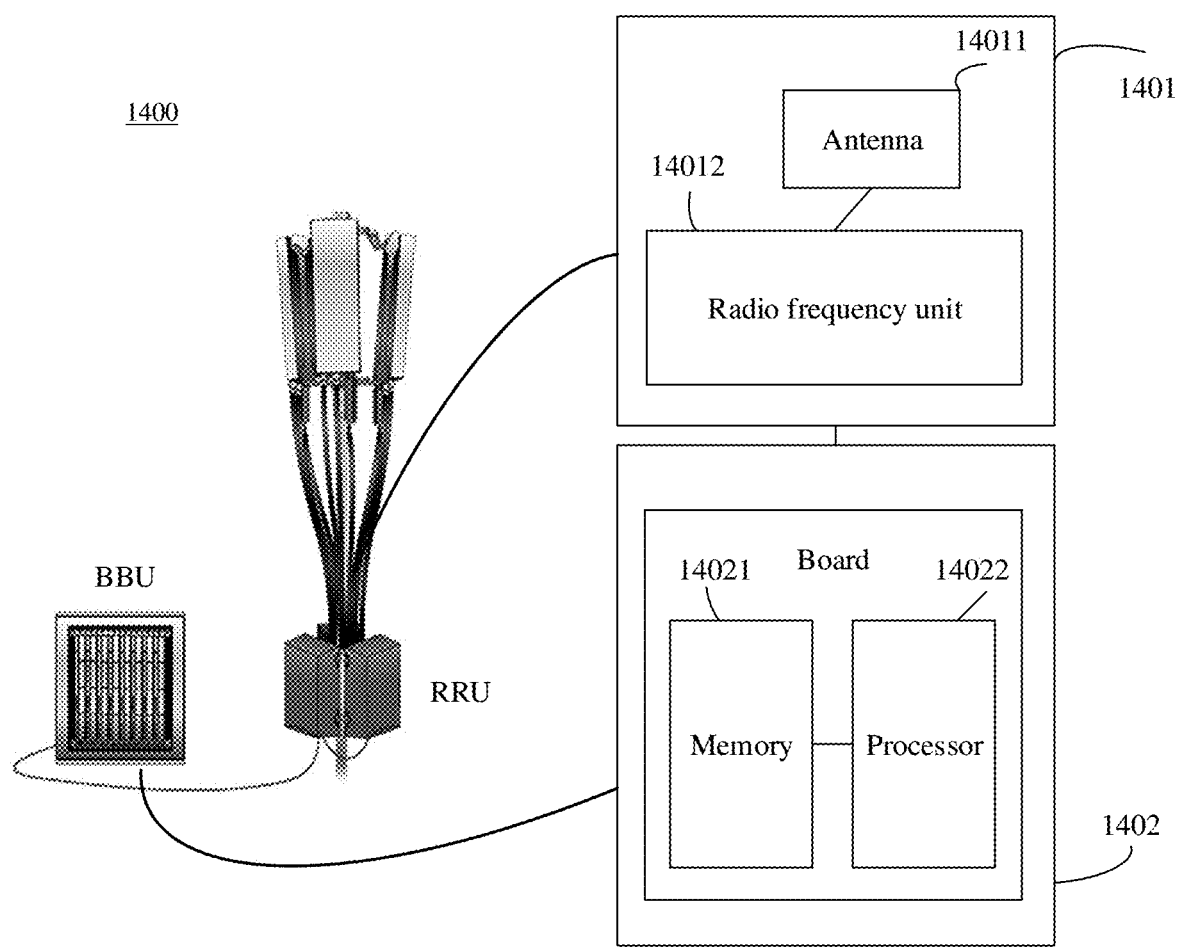
FIG. 14 is another schematic structural diagram of a first wireless device or a second wireless device according to an embodiment of this application.

FIG. 14 is a schematic structural diagram of a network device according to an embodiment of this application. The network device may be, for example, a base station. As shown in FIG. 14, the base station may be used in the system shown in FIG. 1, to implement functions of the first wireless device or the second wireless device in the foregoing method embodiments. The base station 1400 includes one or more radio frequency units, such as a remote radio unit (RRU) 1401 and one or more baseband units (BBU) (also referred to as digital units (DU)) 1402. The RRU 1401 may be referred to as a transceiver unit, a transceiver machine, a transceiver circuit, a transceiver, or the like, and may include at least one antenna 14011 and a radio frequency unit 14012. The RRU 1401 is mainly configured to receive and send a radio frequency signal and perform conversion between a radio frequency signal and a baseband signal, for example, configured to support the base station in performing the sending function shown in FIG. 8. The BBU 1402 is mainly configured to: perform baseband processing, control the base station, and so on. The RRU 1401 and the BBU 1402 may be physically disposed together, or may be physically disposed separately. To be specific, the base station is a distributed base station.

The BBU 1402 is a control center of the base station, may also be referred to as a processing unit, and is mainly configured to implement a baseband processing function, for example, channel coding, multiplexing, modulation, and spreading. For example, the BBU (the processing unit) 1402 may be configured to control the base station to perform the operation procedure related to the network device in the method embodiments.

In an example, the BBU 1402 may include one or more boards, and a plurality of boards may jointly support a radio access network (for example, an LTE network) having a single access standard, or may separately support radio access networks (for example, an LTE network, a 5G network, or another network) having different access standards. The BBU 1402 further includes a memory 14021 and a processor 14022. The memory 14021 is configured to store a necessary instruction and necessary data. For example, the memory 14021 stores various types of indication information in the foregoing method embodiments. The processor 14022 is configured to control the base station to perform a necessary action. For example, the processor 14022 is configured to control the base station to perform the operation procedure in the foregoing method embodiments. The memory 14021 and the processor 14022 may serve one or more boards. In other words, each board is provided with a memory and a processor. Alternatively, a plurality of boards may share a same memory and a same processor. In addition, each board may be further provided with a necessary circuit.

Figure 15:
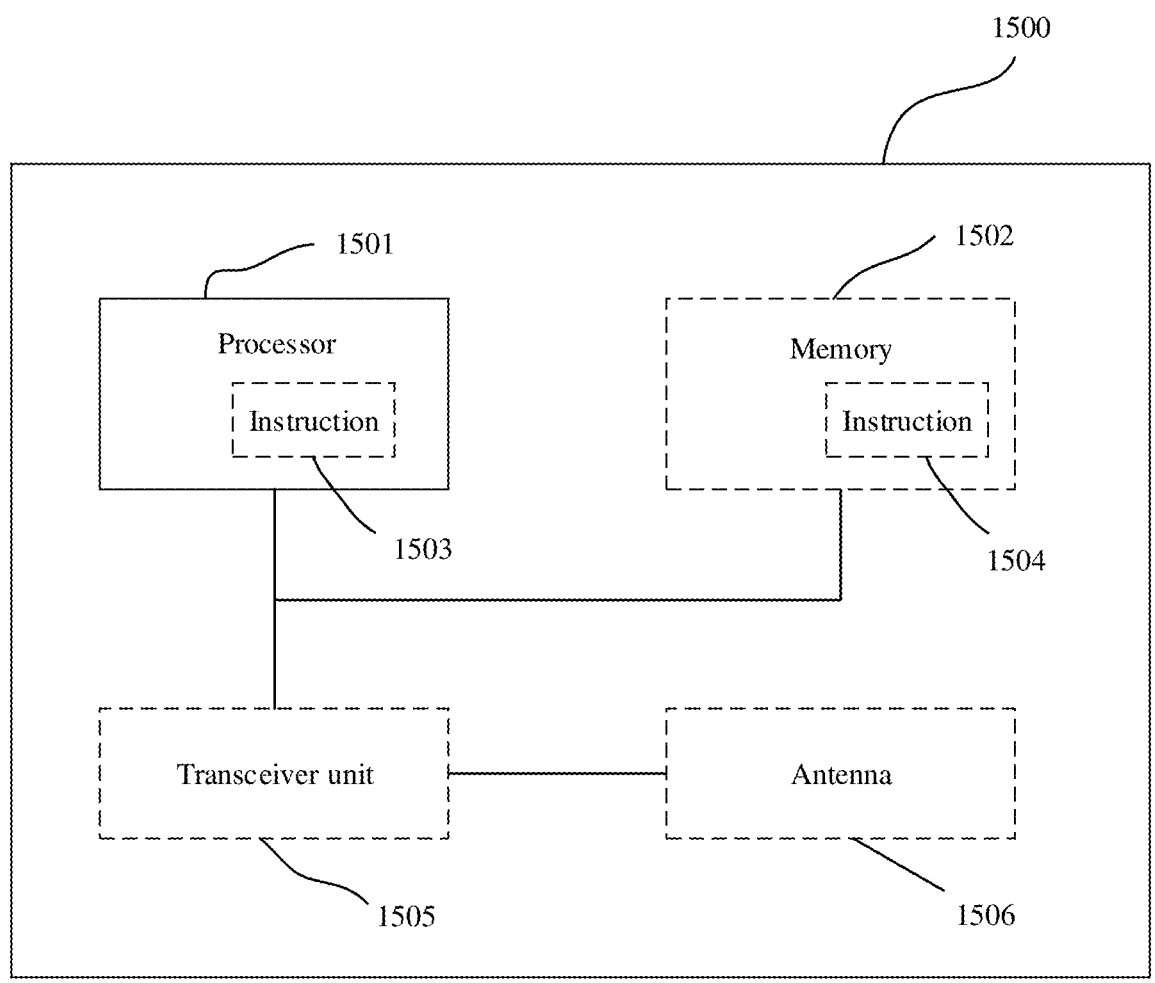
FIG. 15 is a schematic structural diagram of a communications apparatus according to an embodiment of this application.

FIG. 15 is a schematic structural diagram of a communications apparatus 1500. The apparatus 1500 may be configured to implement the method described in the foregoing method embodiments. For details, refer to the descriptions in the foregoing method embodiments. The communications apparatus 1500 may be a chip, a network device (for example, a base station), a terminal device, another wireless communications device, or the like.

The communications apparatus 1500 includes one or more processors 1501. The processor 1501 may be a general-purpose processor, a special-purpose processor, or the like. For example, the processor 1501 may be a baseband processor or a central processing unit. The baseband processor may be configured to process a communications protocol and communications data. The central processing unit may be configured to: control the communications apparatus (for example, a base station, a terminal, or a chip), execute a software program, and process data of the software program. The communications apparatus may include a transceiver unit that is configured to input (receive) and output (send) a signal. For example, the communications apparatus may be a chip, and the transceiver unit may be an input and/or output circuit or a communications interface of the chip. The chip may be used for a terminal, a base station, or another network device. For another example, the communications apparatus may be a terminal, a base station, or another network device, and the transceiver unit may be a transceiver, a radio frequency chip, or the like.

The communications apparatus 1500 includes one or more processors 1501, and the one or more processors 1501 may support the communications apparatus 1500 in implementing the method shown in FIG. 4, FIG. 8, or FIG. 12.

In an example embodiment, the communications apparatus 1500 includes a means for generating indication information and a means for sending the indication information. One or more processors may be used to implement functions of the means for generating the indication information and the means for sending the indication information. For example, the indication information (for example, first indication information and/or second indication information) may be generated by using one or more processors, and the indication information is sent by using a transceiver, an input/output circuit, or an interface of a chip. For the indication information, refer to related descriptions in the foregoing method embodiments.

In an example embodiment, the communications apparatus 1500 includes a means configured to receive the indication information (for example, first indication information and/or second indication information). For the indication information, refer to related descriptions in the foregoing method embodiments. For example, the indication information may be received by using a transceiver, an input/output circuit, or an interface of a chip, and the indication information is parsed by using one or more processors.

Optionally, in an embodiment, the processor 1501 may execute instructions, so that the communications apparatus 1500 performs the methods described in the foregoing method embodiments. All or a part of the instructions, for example, an instruction 1503, may be stored in the processor, or all or a part of the instructions, for example, an instruction 1504, may be stored in the memory 1502 coupled to the processor. Alternatively, the communications apparatus 1500 may be enabled, by using both the instructions 1503 and 1504, to perform the methods described in the foregoing method embodiments.

In still another embodiment, the communications apparatus 1500 may alternatively include a circuit. The circuit may implement functions of the first wireless device or the second wireless device in the foregoing method embodiments.

In another embodiment, the communications apparatus 1500 may include one or more memories 1502 that store an instruction 1504. The instruction may be run on the processor, so that the communications apparatus 1500 performs the methods described in the foregoing method embodiments. Optionally, the memory may further store data. Optionally, the processor may also store an instruction and/or data. For example, the one or more memories 1502 may store the indication information described in the foregoing embodiments. The processor and the memory may be separately disposed, or may be integrated together.

In another embodiment, the communications apparatus 1500 may further include a transceiver unit 1505 and an antenna 1506. The processor 1501 may be referred to as a processing unit, and controls the communications apparatus 1500 (a terminal or a base station). The transceiver unit 1505 may be referred to as a transceiver machine, a transceiver circuit, a transceiver, or the like, and is configured to implement a transceiver function of the communications apparatus 1500 through the antenna 1506.

An embodiment of this application further provides a communications system, including the foregoing one or more network devices and one or more terminal devices.

It should be noted that the processor in the embodiments of this application may be an integrated circuit chip, and has signal processing capability. In an implementation process, steps in the foregoing method embodiments may be implemented by using a hardware integrated logic circuit in the processor or one or more instructions in a form of software. The foregoing processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. It may implement or perform the methods, steps, and logical block diagrams that are disclosed in the embodiments of this application. The general-purpose processor may be a microprocessor, or the processor may be any conventional processor or the like. Steps of the methods disclosed with reference to this application may be directly performed and completed by using a hardware decoding processor, or may be performed and completed by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in a memory, and the processor reads information in the memory and completes the steps in the foregoing methods in combination with the hardware of the processor.

It can be understood that the memory in this application may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (electrically EPROM, EEPROM), or a flash memory. The volatile memory may be a random access memory (RAM), used as an external cache. Through example but not limitative description, many forms of RAMs are available, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memory in the system and the methods described in this specification intends to include but is not limited to these memories and any memory of another proper type.

An embodiment of this application further provides a computer-readable medium. The computer-readable medium stores a computer program. When the computer program is executed by a computer, the communication method in any one of the foregoing method embodiments is implemented.

Another embodiment of this application further provides a computer program product. When the computer program product is executed by a computer, the communication method in any one of the foregoing method embodiments is implemented.

All or some of the foregoing embodiments may be implemented by using software, hardware, firmware, or any combination thereof. When the software is used to implement the embodiments, all or some of the embodiments may be implemented in a form of a computer program product. The computer program product includes one or more computer instructions. When the computer instructions are loaded and executed on the computer, the procedure or functions according to the embodiments of this application are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any available medium accessible by a computer, or a data storage device, such as a server or a data center, integrating one or more available media. The usable medium may be a magnetic medium (for example, a floppy disk, a hard disk, or a magnetic tape), an optical medium (for example, a high-density digital video disc (digital video disc, DVD)), a semiconductor medium (for example, a solid-state drive (SSD)), or the like.

An embodiment of this application further provides a processing apparatus, including a processor and an interface. The processor is configured to perform the communication method in any one of the foregoing method embodiments.

It should be understood that the processing apparatus may be a chip. The processor may be implemented by hardware, or may be implemented by software. When implemented by the hardware, the processor may be a logic circuit, an integrated circuit, or the like. When implemented by the software, the processor may be a general-purpose processor. The general-purpose processor is implemented by reading software code stored in a memory. The memory may be integrated into the processor, may be located outside the processor, or may exist independently.

In the embodiments of this application, sequence numbers of the steps do not mean execution sequences, and should not be construed as any limitation on an implementation process of the embodiments of this application. The execution sequences of the steps should be determined based on functions and internal logic of the steps.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

A person of ordinary skill in the art may understand that, in combination with the examples described in the embodiments disclosed in this specification, units and algorithm steps may be implemented by electronic hardware, computer software, or a combination thereof. To clearly describe the interchangeability between the hardware and the software, the foregoing has usually described compositions and steps of each example based on functions. Whether the functions are performed by hardware or software depends on particular applications and design constraints of the technical solutions. A person skilled in the art may use different methods to implement a described function for each particular application, but it should not be considered that the implementation goes beyond the scope of this application.

A person skilled in the art may clearly understand that, for the purpose of convenient and brief description, for detailed working processes of the foregoing system, apparatus, and unit, refer to corresponding processes in the foregoing method embodiments, and details are not described herein again.

In the several embodiments provided in this application, it should be understood that the disclosed system, apparatus, and method may be implemented in other manners. For example, the described apparatus embodiments are merely examples. For example, division into units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments in this application.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

With descriptions of the foregoing implementations, a person skilled in the art may clearly understand that this application may be implemented by hardware, firmware, or a combination thereof. When the embodiments of this application are implemented by software, the foregoing functions may be stored in a computer-readable medium or transmitted as one or more instructions or code in a computer-readable medium. The computer-readable medium includes a computer storage medium and a communications medium. The communications medium includes any medium that enables a computer program to be transmitted from one place to another. The storage medium may be any available medium accessible by a computer. The following provides an example but does not impose a limitation: The computer-readable medium may include a RAM, a ROM, an EEPROM, a CD-ROM, another compact disc storage or magnetic disk storage medium, another magnetic storage device, or any other medium that can carry or store expected program code in a form of one or more instructions or a data structure and can be accessed by the computer. In addition, any connection may be appropriately defined as a computer-readable medium. For example, if software is transmitted from a website, a server, or another remote source through a coaxial cable, an optical fiber/cable, a twisted pair, a digital subscriber line (DSL) or wireless technologies such as infrared ray, radio, and microwave, the coaxial cable, optical fiber/cable, twisted pair, DSL, or the wireless technologies such as infrared ray, radio, and microwave are included in fixation of a medium to which they belong. For example, a disk and or a disc used in this application includes a compact disc (CD), a laser disc, an optical disc, a digital versatile disc (DVD), a floppy disk, and a Blu-ray disc. The disk usually copies data in a magnetic manner, and the disc copies data optically through a laser. The foregoing combination shall also be included in the protection scope of the computer-readable medium.

In conclusion, the foregoing descriptions are merely example embodiments of the technical solutions of this application, but are not intended to limit the protection scope of this application. Any modification, equivalent replacement, or improvement made without departing from the spirit and principle of this application shall fall within the protection scope of this application.

The invention claimed is:

1. A communication method, comprising:
receiving, by a first wireless device, first indication information in a first time unit, wherein the first indication information indicates a second wireless device to transmit data in a second time unit, or the first indication information indicates a second wireless device not to transmit data in a second time unit, wherein the second time unit is a preset time unit used by the second wireless device to transmit data,
wherein the first indication information indicates the second wireless device not to transmit data in the second time unit, and the method further comprises:
receiving or detecting, by the first wireless device, second indication information in a fourth time unit, wherein the second indication information indicates whether the first wireless device is capable of transmitting data in the second time unit, wherein a time domain position of the fourth time unit is before the time domain position of the second time unit, and the time domain position of the fourth time unit is after the time domain position of the first time unit.

2. The method according to claim 1, further comprising:
performing, by the first wireless device, channel detection and/or clear channel assessment (CCA) in a third time unit, wherein a time domain position of the third time unit is after a time domain position of the first time unit, and the time domain position of the third time unit is before a time domain position of the second time unit.

3. The method according to claim 1, further comprising:
performing, by the first wireless device, channel detection and/or CCA in a fifth time unit, wherein a time domain position of the fifth time unit is before the time domain position of the second time unit, and the time domain position of the fifth time unit is after the time domain position of the fourth time unit.

4. The method according to claim 1, wherein
the second indication information comprises an identifier of the first wireless device, and/or the second indication information comprises a group identifier of a wireless device group to which the first wireless device belongs.

5. A communication method, comprising:
obtaining, by a second wireless device, first indication information, wherein the first indication information indicates the second wireless device to transmit data in a second time unit, or the first indication information indicates the second wireless device not to transmit data in a second time unit, wherein the second time unit is a preset time unit used by the second wireless device to transmit data; and
sending, by the second wireless device, the first indication information in a first time unit, wherein the first indication information indicates the second wireless device not to transmit data in the second time unit, and the method further comprises:

sending, by the second wireless device, second indication information in a fourth time unit, wherein the second indication information indicates a wireless device that transmits data in the second time unit, wherein a time domain position of the fourth time unit is before a time domain position of the second time unit, and the time domain position of the fourth time unit is after a time domain position of the first time unit.

6. The method according to claim 5, wherein the second indication information comprises an identifier of the wireless device, and/or the second indication information comprises a group identifier of a wireless device group to which the wireless device belongs.

7. The method according to claim 5, further comprising: determining, by the second wireless device, the second time unit.

8. The method according to claim 7, wherein the determination of the second time unit comprises:
determining, by the second wireless device, the second time unit according to a preset rule; or
obtaining, by the second wireless device, higher layer signaling, wherein the higher layer signaling indicates the second time unit; and
determining, by the second wireless device, the second time unit based on the higher layer signaling.

9. A communication method, comprising:
obtaining, by a second wireless device, first indication information, wherein the first indication information indicates the second wireless device to transmit data in a second time unit, or the first indication information indicates the second wireless device not to transmit data in a second time unit, wherein the second time unit is a preset time unit used by the second wireless device to transmit data; and
sending, by the second wireless device, the first indication information in a first time unit, wherein the first indication information indicates the second wireless device to transmit data in the second time unit, and the method further comprises:
performing, by the second wireless device, channel detection and/or clear channel assessment (CCA) in a sixth time unit, wherein a time domain position of the sixth time unit is before a time domain position of the second time unit, and the time domain position of the sixth time unit is after a time domain position of a fourth time unit.

10. A communications apparatus, comprising a receiver, configured to:
receive first indication information in a first time unit, wherein the first indication information is indicative of a second wireless device to transmit data in a second time unit, or the first indication information is indicative of a second wireless device not to transmit data in a second time unit, wherein the second time unit is a preset time unit used by the second wireless device to transmit data,
wherein the first indication information indicates the second wireless device not to transmit data in the second time unit, and the communication apparatus further comprises at least one processor configured to:
receive or detect second indication information in a fourth time unit, wherein the second indication information is indicative of whether the communications apparatus is capable of transmitting data in the second time unit, a time domain position of the fourth time unit is before the time domain position of the second time unit, and the time domain position of the fourth time unit is after the time domain position of the first time unit.

11. The communications apparatus according to claim 10, the at least one processor is further configured to:
perform channel detection and/or clear channel assessment (CCA) in a third time unit, wherein a time domain position of the third time unit is after a time domain position of the first time unit, and the time domain position of the third time unit is before a time domain position of the second time unit.

12. The communications apparatus according to claim 10, wherein the at least one processor is further configured to:
perform channel detection and/or CCA in a fifth time unit, wherein a time domain position of the fifth time unit is before the time domain position of the second time unit, and the time domain position of the fifth time unit is after the time domain position of the fourth time unit.

13. The communications apparatus according to claim 10, wherein
the second indication information comprises an identifier of the communications apparatus, and/or the second indication information comprises a group identifier of a wireless device group to which the communications apparatus belongs.

14. A communications apparatus, comprising at least one processor and a transmitter, wherein
the at least one processor is configured to obtain first indication information, wherein the first indication information is indicative of the communications apparatus to transmit data in a second time unit, or the first indication information is indicative of the communications apparatus not to transmit data in a second time unit, wherein the second time unit is a preset time unit used by the communications apparatus to transmit data; and
the transmitter is configured to send the first indication information in a first time unit,
wherein first indication information indicates the communications apparatus not to transmit data in the second time unit, and the transmitter is further configured to:
send second indication information in a fourth time unit, wherein the second indication information is indicative of a wireless device that transmits data in the second time unit, a time domain position of the fourth time unit is before a time domain position of the second time unit, and the time domain position of the fourth time unit is after a time domain position of the first time unit.

15. The communications apparatus according to claim 14, wherein the second indication information comprises an identifier of the wireless device, and/or the second indication information comprises a group identifier of a wireless device group to which the wireless device belongs.

16. A communications apparatus, comprising at least one processor and a transmitter, wherein
the at least one processor is configured to obtain first indication information, wherein the first indication information is indicative of the communications apparatus to transmit data in a second time unit, or the first indication information is indicative of the communications apparatus not to transmit data in a second time unit, wherein the second time unit is a preset time unit used by the communications apparatus to transmit data; and
the transmitter is configured to send the first indication information in a first time unit, wherein the first indication information indicates the communications apparatus to transmit data in the second time unit, and the at least one processor is further configured to:

perform channel detection and/or CCA in a sixth time unit, wherein a time domain position of the sixth time unit is before a time domain position of the second time unit, and the time domain position of the sixth time unit is after a time domain position of a fourth time unit.

\* \* \* \* \*